United States Patent [19]

Lieberam

[11] Patent Number: 5,853,671

[45] Date of Patent: Dec. 29, 1998

[54] CONDENSER COOLING AND TEMPERATURE CONTROL SYSTEM

[76] Inventor: Kai Lieberam, 1307 Countryside Pl., Smyrna, Ga. 30080

[21] Appl. No.: 334,758

[22] Filed: Nov. 4, 1994

Related U.S. Application Data

[63] Continuation of Ser. No. 311,290, Feb. 16, 1989, abandoned.

[51] Int. Cl.[6] ............................. G05D 16/00; B01D 3/42; B01D 3/10
[52] U.S. Cl. ...................... 422/112; 202/160; 202/185.1; 202/205; 202/206
[58] Field of Search .................................. 422/112, 138, 422/308; 526/61, 67; 202/160, 185.1, 205, 206

[56] References Cited

U.S. PATENT DOCUMENTS

| 4,438,073 | 3/1984 | Kubo et al. | 422/135 |
| 5,393,498 | 2/1995 | Lieberam | 422/112 |

*Primary Examiner*—Nina Bhat
*Attorney, Agent, or Firm*—Donald R. Andersen; Smith, Howard & Ajax

[57] ABSTRACT

An improved condenser system for condensing vapor containing liquid or solid particles to minimize contamination of the condenser system by such particles and to increase the efficiency of liquid processing systems, including extracting particles from the vapor producing processing and cool down of the liquid and returning the particles to the processing container without fouling the condenser system or losing product.

48 Claims, 15 Drawing Sheets

"CONDENSER SYSTEM"

(EXCEPT PRESSURE MEASUREMENT)

"THE CHAIN"

"AGITATION"

"ENTRAINMENT"

"VELOCITY-KETTLE HEAD HEIGHT PROFILE"

"VAPOR-RECOVERY-LINE"

"CONDENSER"

"COOLING-WATER-SYSTEM"

"VACUUM SYSTEM"
IMPROVED PRESSURE
MEASUREMENT SYSTEM

"PRESSURE BEHAVIOR
OF THE REFLUX LINE"

"REFLUX LINE LEADS
INTO LIQUID"

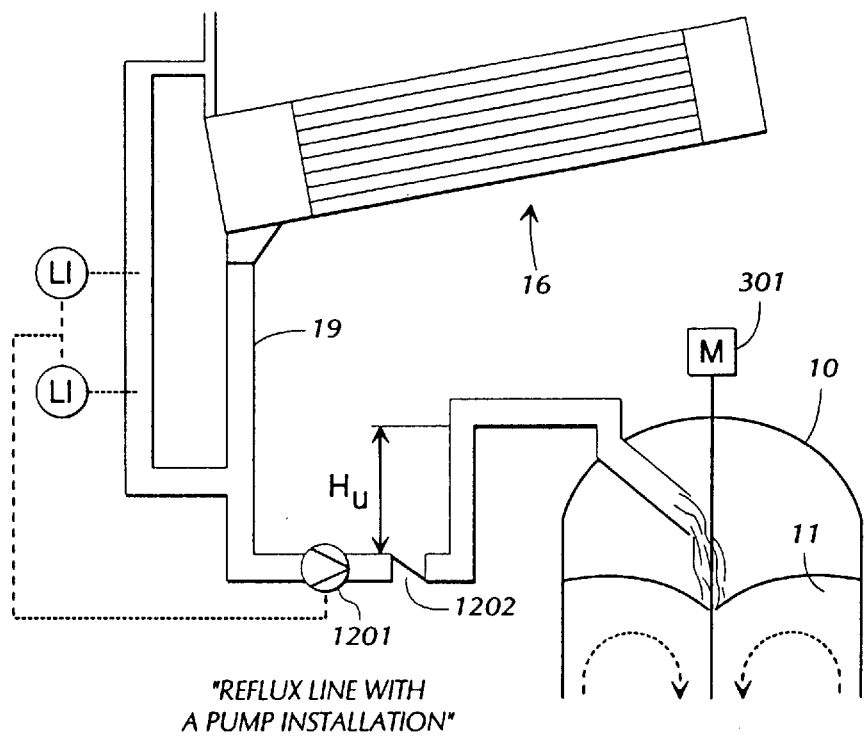
"REFLUX LINE WITH
A PUMP INSTALLATION"
FIG. 12
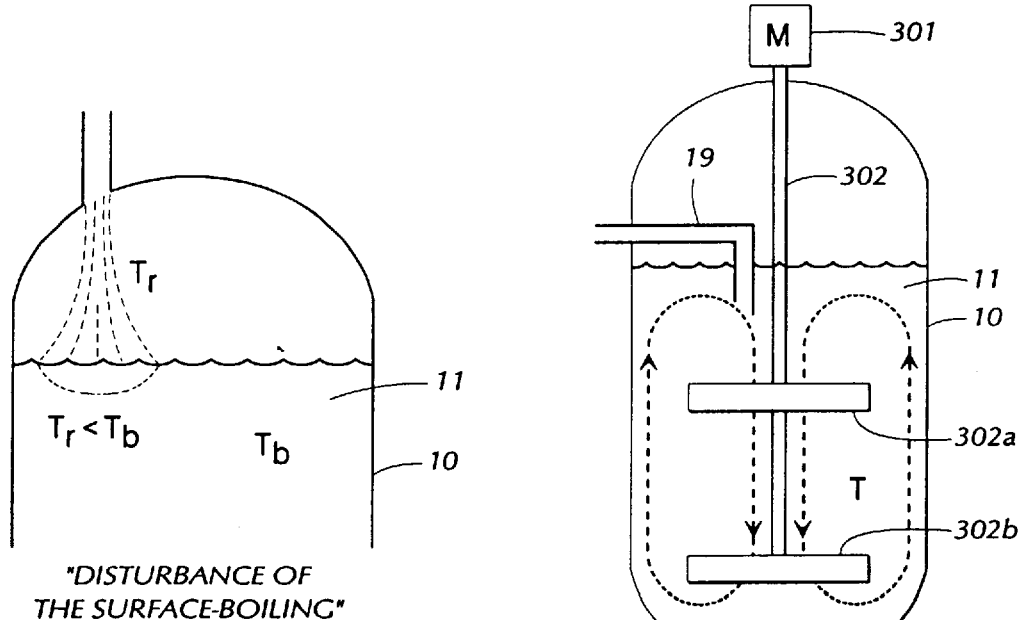
"DISTURBANCE OF
THE SURFACE-BOILING"
FIG. 13
(PRIOR ART)
"REFLUX LINE LEADS
INTO LIQUID"
FIG. 14

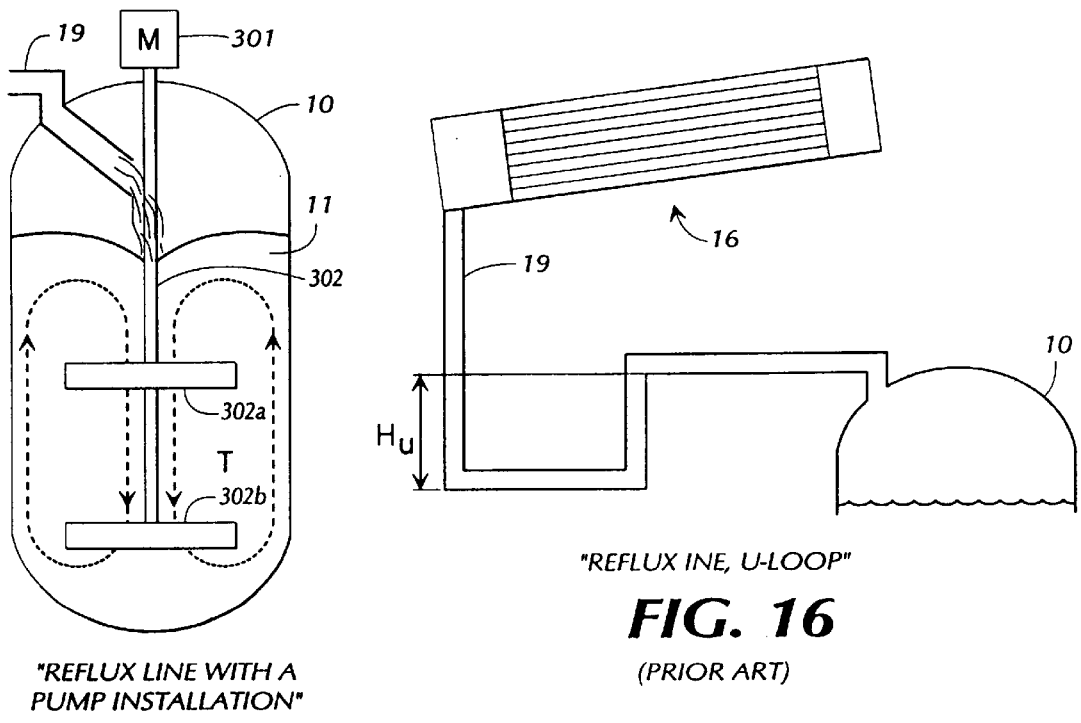
"REFLUX LINE WITH A PUMP INSTALLATION"
FIG. 15
"REFLUX INE, U-LOOP"
FIG. 16
(PRIOR ART)
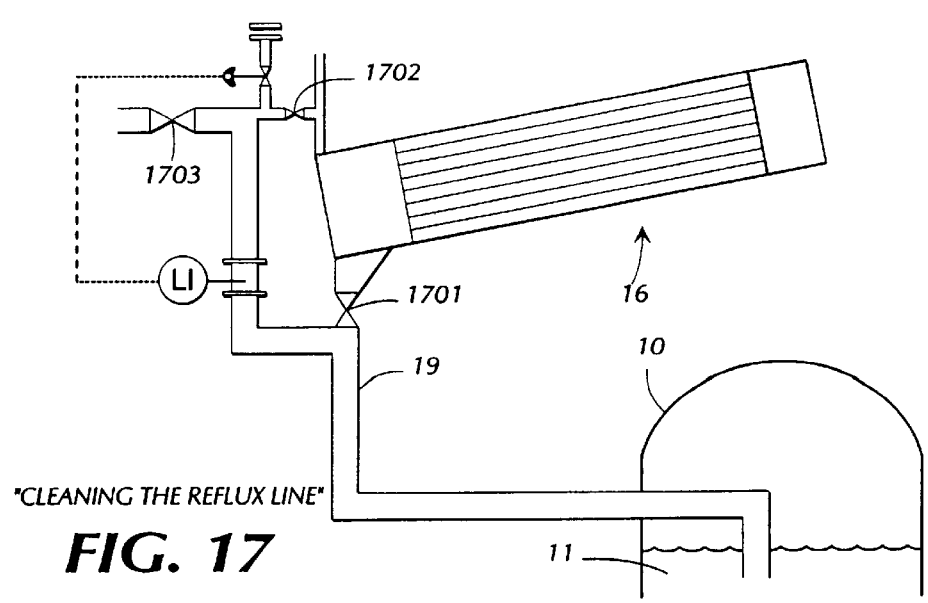
"CLEANING THE REFLUX LINE"
FIG. 17

"FLOODING THE CONDENSER"

"PREVENTION OF CONDENSER FLOODING"

"PREVENTION OF CONDENSER FLOODING"

"REFLUX COLLECTOR"

"PRESSURE BEHAVIOR OF THE CONDENSER SYSTEM"

"REFLUX LINE AT A RUN-AWAY-REACTION"

"THE CYCLONE"

"INSTALLATION OF THE CYCLONE WITH THE LOW- AND HIGH TEMPERATURE SEQUENCE"

"LOW- AND HIGH TEMPERATURE SEQUENCE"

"VELOCITY-KETTLE HEAD HEIGHT PROFILE"

"IMPROVED ENTRAINMENT PROPOSAL WITH THE CYCLONE AND THE KETTLE HEAD HEIGHT"

"REFLUX LINE AT EXISTING KETTLES"

"DISTURBANCE OF THE SURFACE-BOILING"

"TRAFFIC PROBLEM AT THE ENTRANCE OF THE REFLUX LINE"

"ΔP-OPERATION"

"OPTIMUM PRESSURE-TEMPERATURE-PROFILE FOR EACH KETTLE"

"AUTOMATIC PREVENTION OF CONDENSER FLOODING"

"MANUAL PREVENTION OF CONDENSER FLOODING"

CONDENSER COOLING AND TEMPERATURE CONTROL SYSTEM

This is a continuation of application Ser. No. 07/311,290 filed Feb. 16, 1989, now abandoned.

BACKGROUND OF THE INVENTION

The main problem in processing certain liquids, including manufacturing resins, is to control the temperature of the processing container, especially in the case of strong exothermic reactions present in processing P/F resin. In the case of processing resin, for example, in the past the prior art has not always had sufficient cooling capacity in their condensers to control the exothermic portion of the reaction.

This has led in extreme cases to atmospheric venting of the kettle contents. Because of this, a high cooling capacity is necessary to produce the resin in a safe and economic manner. The problem is solved by the recognition of important considerations of the system design so it can be balanced, along with a change in the operation of the process and a new solution for handling the problem of entrainment. For the production of resin, the preresinous solution must be preheated to a certain temperature where the exothermic reaction can start efficiently. The batchcook has to follow a time temperature profile. During the production of resin, the condenser system is needed

- to keep a certain temperature in the kettle and to remove the exothermic heat
- to cooldown the batch to a certain temperature or to the lowest temperature at the final cooldown, as fast as possible
- to catch an out of control reaction created by a strong exothermic reaction (exothermic heat increases exponentially with temperature)

The batch cook is cooled by means of a vacuum system which decreases the pressure in the kettle to the boiling point temperature (temperature pressure boiling point curve) and creates the pressure difference which pulls vapor and an unknown amount of liquid resin (entrainment) through a vapor recovery line and into a condenser. The vapor is then transported through a condenser in which the vapor collapses to liquid (reflux). These tubes are surrounded by coolant, such as water, which circulates through the condenser. As a result, the latent heat (resulting from changing vapor to liquid (reflux)) and heat from additional subcooling of the reflux is transferred to the circulating water (in the coolant system) and removed from the condenser system and accordingly) from the kettle. The condensed reflux is then returned by means of a reflux line to the kettle.

In existing condenser systems, liquid resin, entrainment, which is pulled from the surface of the batchcook by the vapor velocity accelerating at the batch surface, accumulates on the walls of the condenser tubes. This resinous coating reduces the heat transfer coefficient from the collapsing vapor to the circulating water (coolant system) in the condenser.

This reduction of efficiency of heat transfer increases the amount of time and cost required to cool the batchcook. As a consequence of the resin buildup, which is known as fouling, frequent cleaning of the condenser system is required.

Also, in the prior art, the operation of the system is controlled by observing the liquid level in a sight glass in the reflux line to control system operation. The prior art did not control system operation as a function of the pressure difference in the system. The present invention includes installation of two pressure transmitters to determine system pressure difference between the kettle pressure and the vacuum source, as well as absolute pressure at the kettle. The system is then controlled by reference to the pressure difference which is considered to be the driving force for the kinetic energy which results in the mass flow and cooling rate.

SUMMERY OF THE INVENTION

A principal object of the present invention is to retard entrainment accumulation within the condenser tubes.

Another object of the present invention is to return to the batchcook entrainment which would have otherwise accumulated in the condenser tubes.

A further object of this invention is to increase efficiency of present systems.

A further objective of this invention is to prevent atmospheric venting of the liquid container contents, i.e., control of a high exothermic reaction.

Another important objective of this invention is to improve the way of operating the process.

An additional object of this invention is to reduce batchcook time through faster cooldown and higher batch temperature.

Another important object of the present invention is to decrease overall costs, including costs of condenser system cleaning.

The foregoing objects and still further objects will be understood based upon the following detailed description of preferred embodiments and drawings, in which the parts described in the specification are all shown by like numbered parts in the drawings.

3

Figure 11:
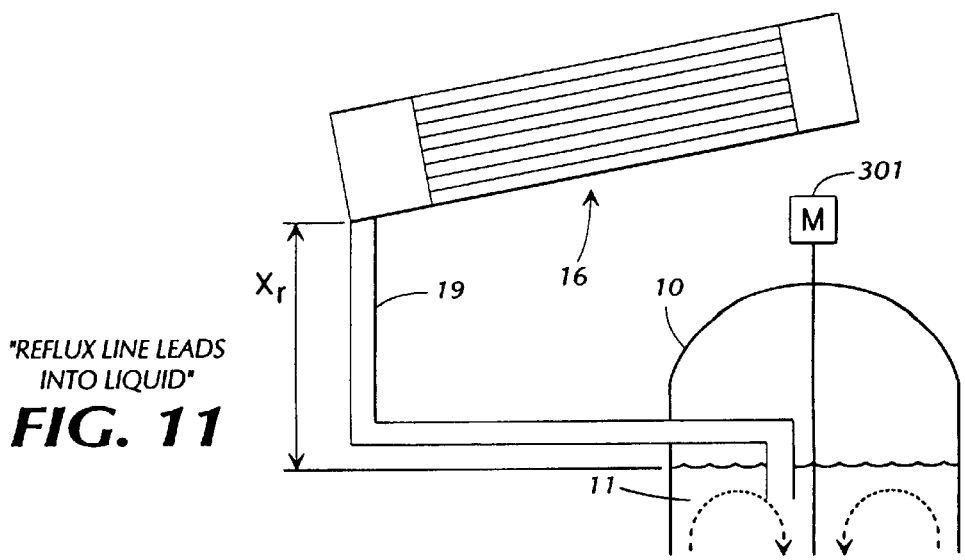
Figure 18:
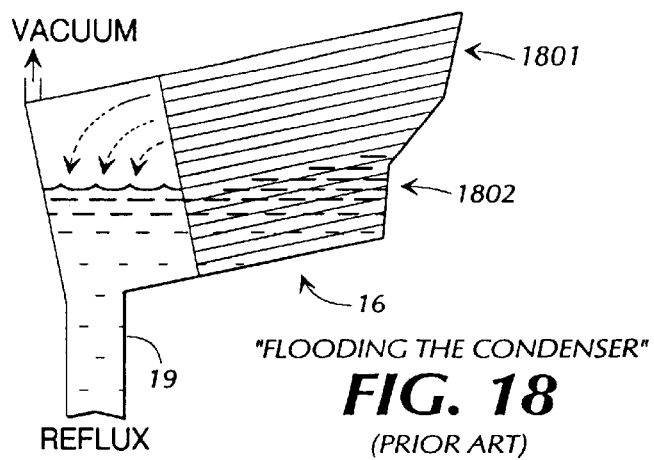
Figure 19:
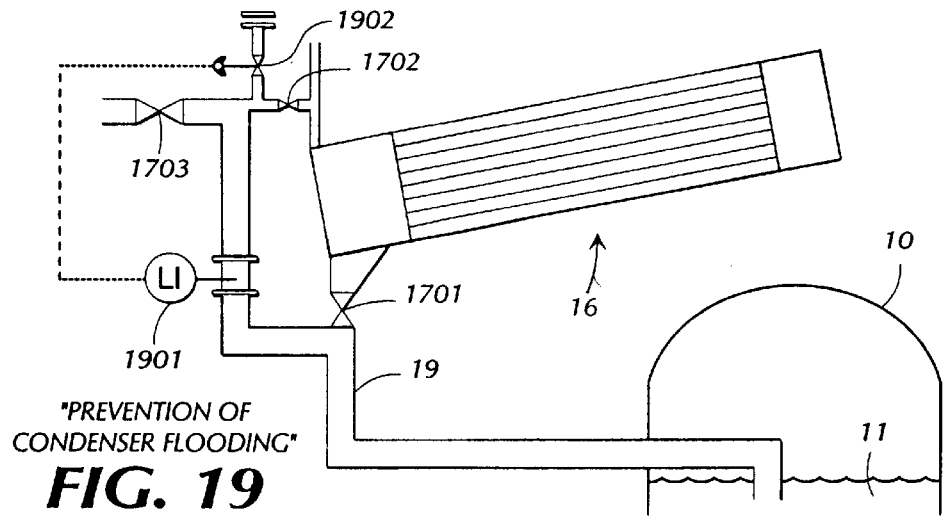
Figure 20:
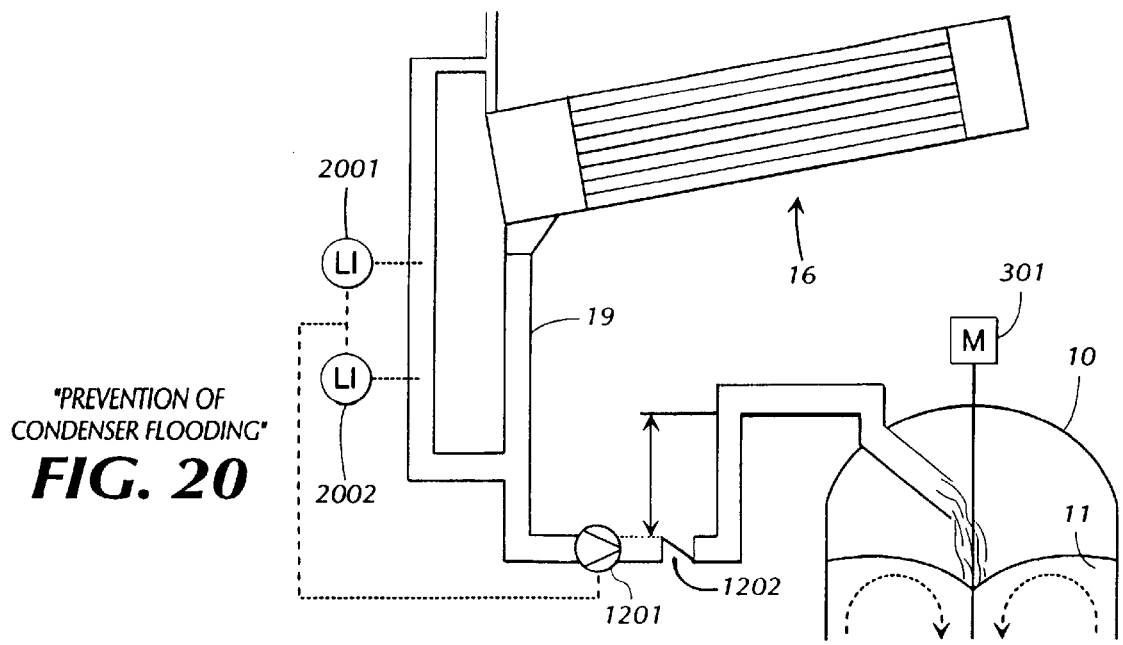
Figure 21:
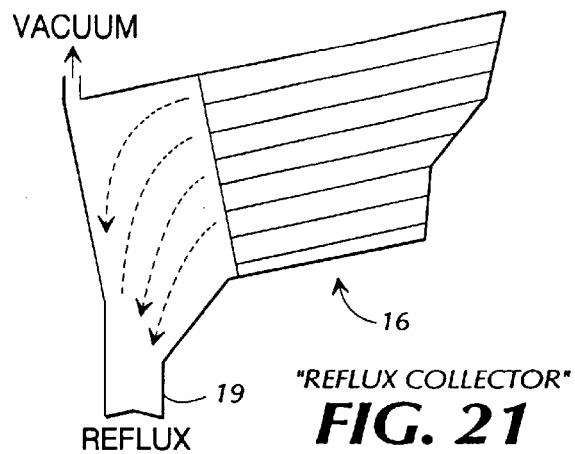
Figure 22:
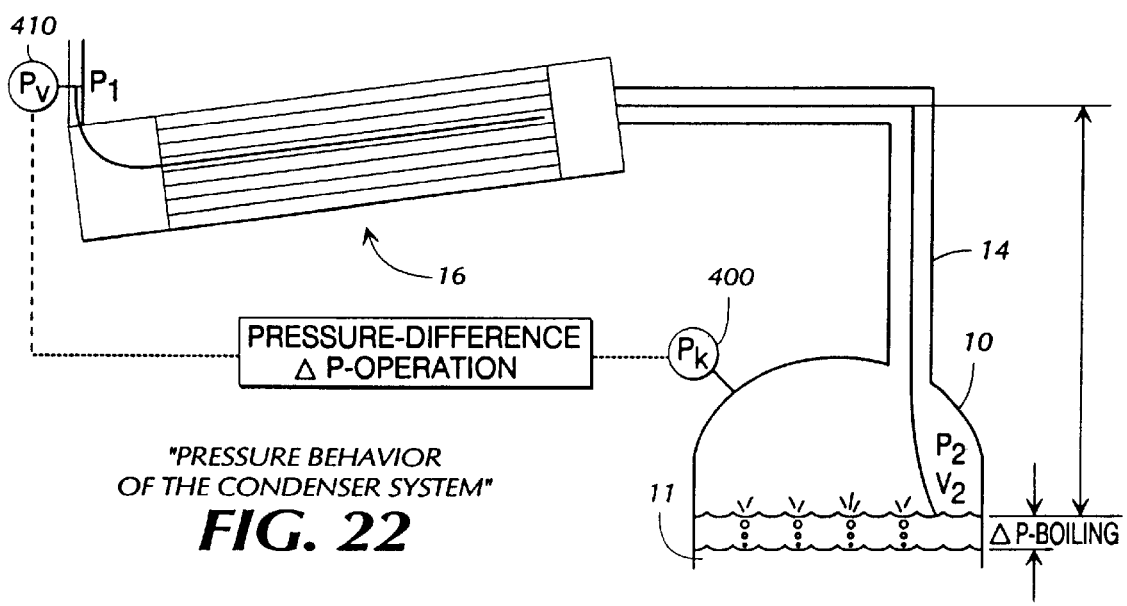
Figure 23:
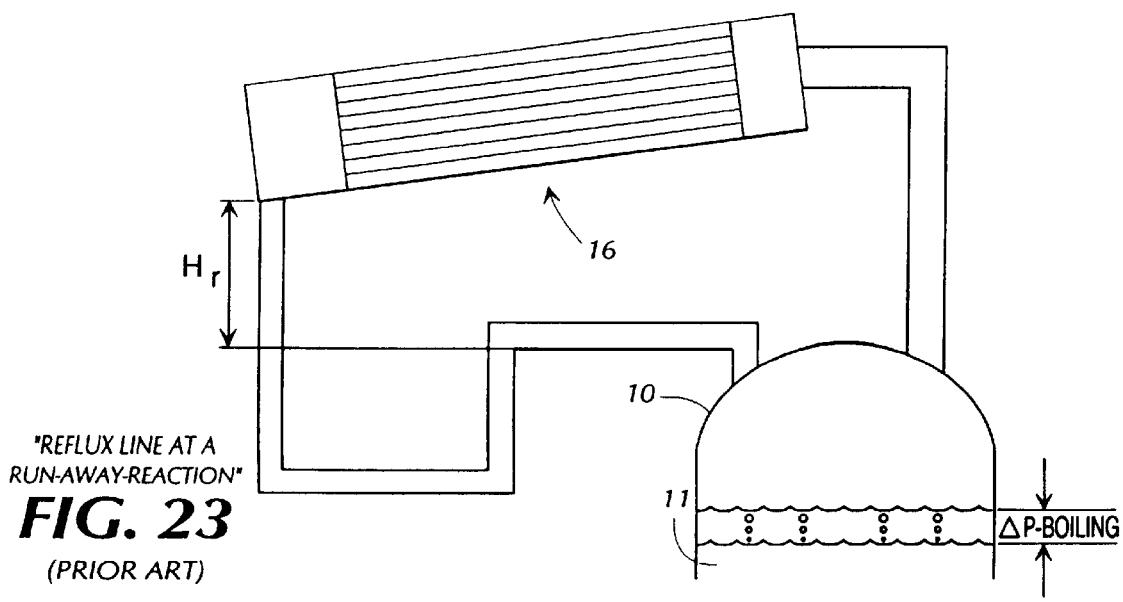
Figure 24:
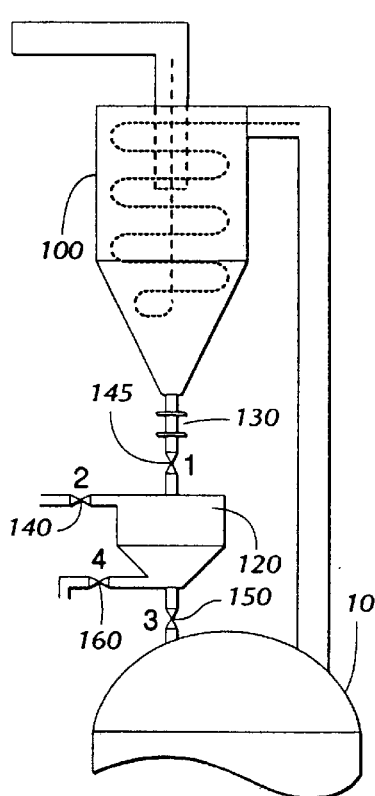
Figure 26:
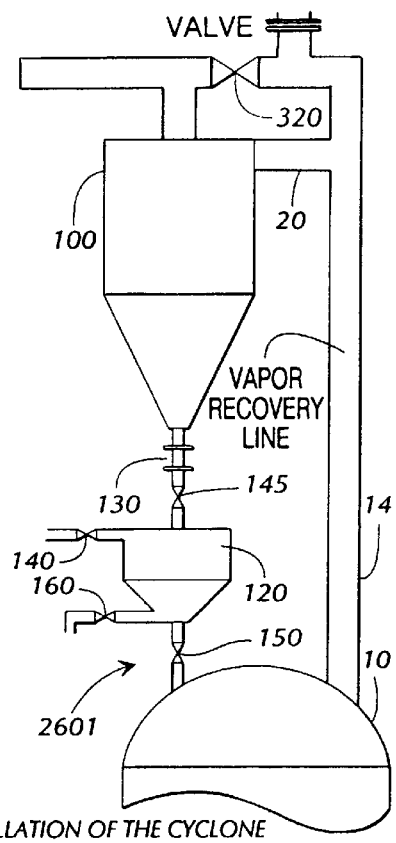
Figure 25:
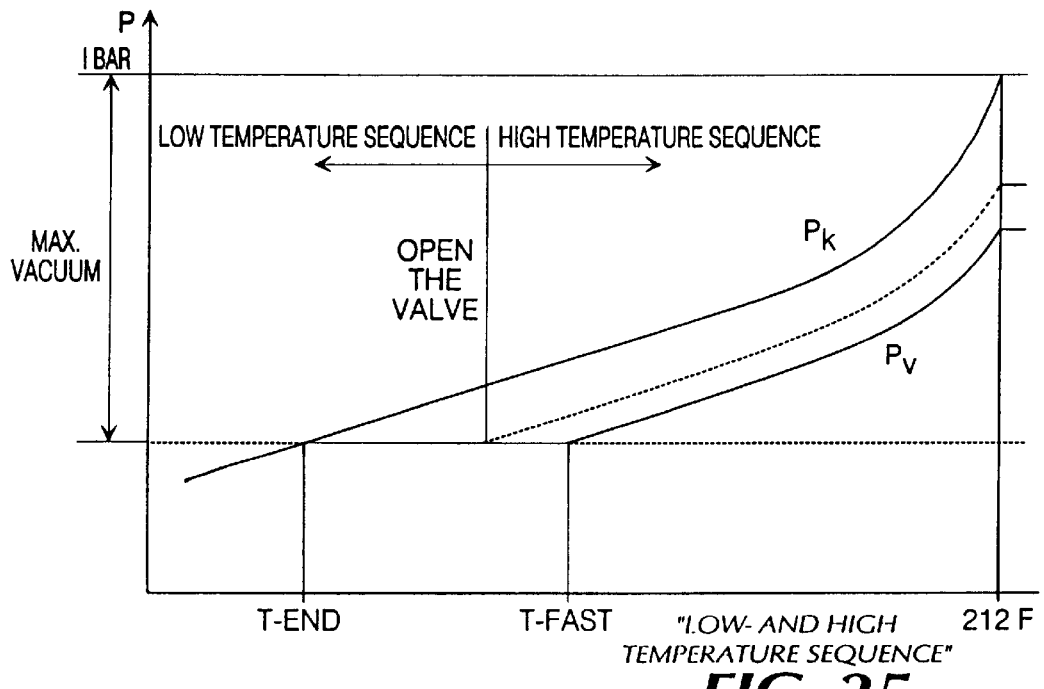
Figure 27:
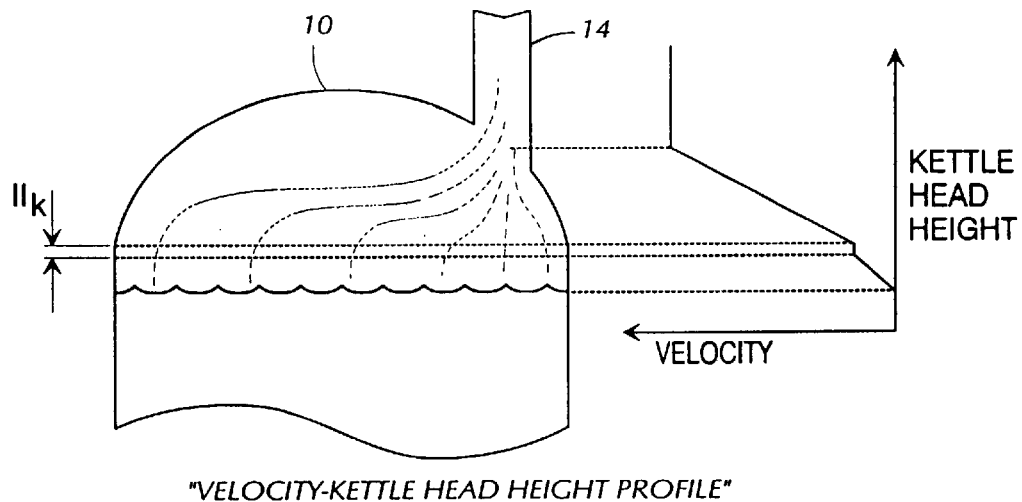
Figure 28:
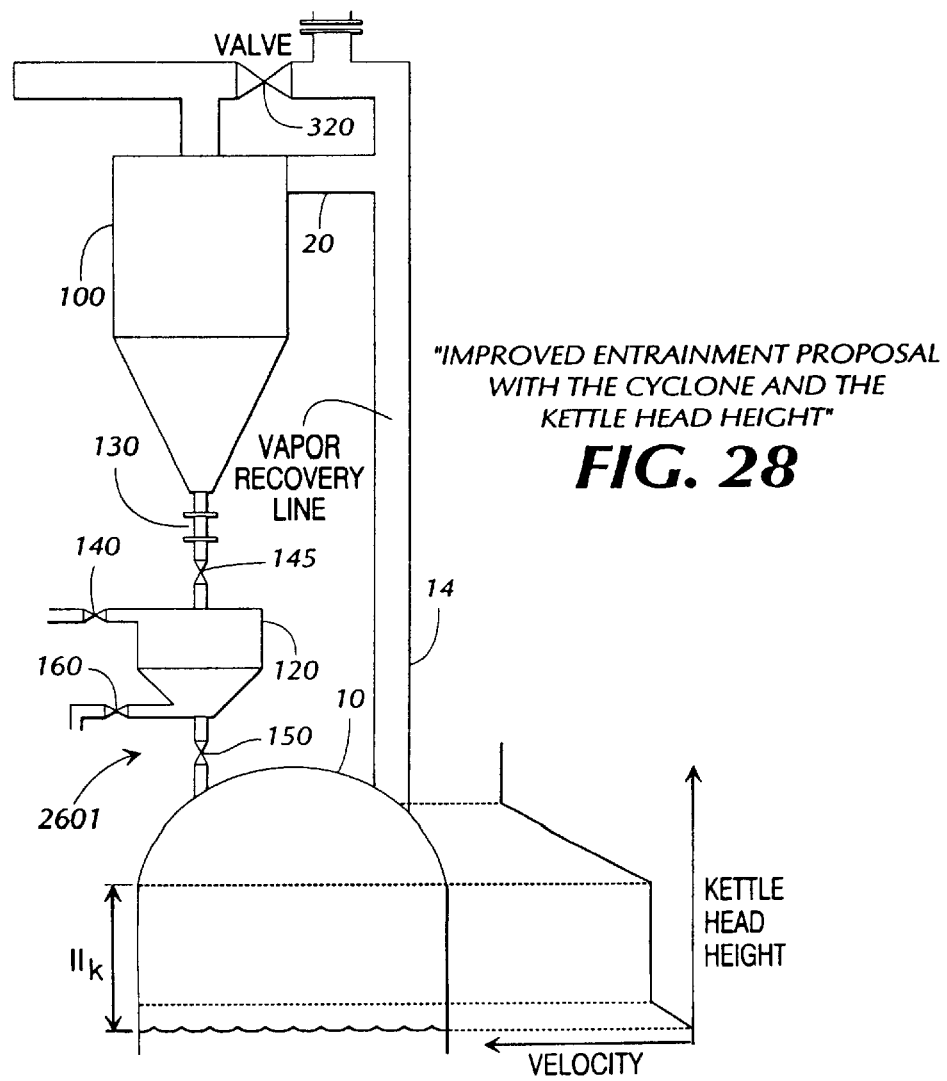

FIG. 11 is a further schematic diagram of an existing condenser system demonstrating the effect of reflux line configuration on condenser system operation;

FIG. 12 is a schematic diagram of an alternative improved condenser system including a pump means for providing a positive difference in the reflux line;

FIG. 13 is a schematic diagram of an existing kettle demonstrating the effect of returning reflux above the level of the liquid surface of the batch in he kettle;

FIG. 14 is a schematic diagram of a kettle demonstrating the effect of returning reflux below the level of the liquid surface of the batch in the kettle;

FIG. 15 is a schematic diagram of an improved kettle demonstrating the effect of returning the reflux along the axis of the agitation means above the level of the liquid surface of the batch in the kettle;

FIG. 16 is a schematic diagram of a reflux line, U-Loop of an existing condenser system, demonstrating the significance of U-Loop height;

FIG. 17 is a schematic diagram of an improved means for cleaning the reflux line;

FIG. 18 is a schematic diagram of an existing condenser system demonstrating the effect of reflux line design and configuration on condenser output;

FIG. 19 is a schematic diagram of a first improved condenser reflux line design and configuration designed to prevent condenser flooding;

FIG. 20 is a schematic diagram of a second improved condenser reflux line design and configuration designed to prevent condenser flooding;

FIG. 21 is a schematic diagram of a reflux collector for use in conjunction with an improved condenser system according to the present invention;

FIG. 22 is a schematic diagram of a segment of the improved condenser system according to the present invention demonstrating the measurement of pressure differential between the vacuum line and the surface of the batch in the kettle;

FIG. 23 is a schematic diagram of an existing condenser system demonstrating the system during a run away exothermic reaction;

FIG. 24 is a schematic diagram of an improved condenser system including a cyclone means for removal of entrainment from the vapor recovery line prior to introduction of the vapor into the condenser;

FIG. 25 is a graphic representation of the pressure temperature relationship of the kettle and vacuum line during the cooldown of the batch, demonstrating the process of cooling the batch in accordance with the present invention;

FIG. 26 is a schematic diagram of an improved condenser system including a cyclone means for removal of entrainment from the vapor recovery line and means for bypassing the cyclone means operation in accordance with the present invention;

FIG. 27 is a schematic diagram of an existing condenser system demonstrating the kettle head height and combined with graphic representation of the effect of kettle head height and kettle head vapor velocity on entrained particles removed from the surface of the liquid;

FIG. 28 is a schematic diagram of an improved condenser system of the present invention combined with a graphic representation of the effect of kettle head height and kettle head vapor velocity on entrained particles removed from the surface of the liquid;

4

Figure 29:
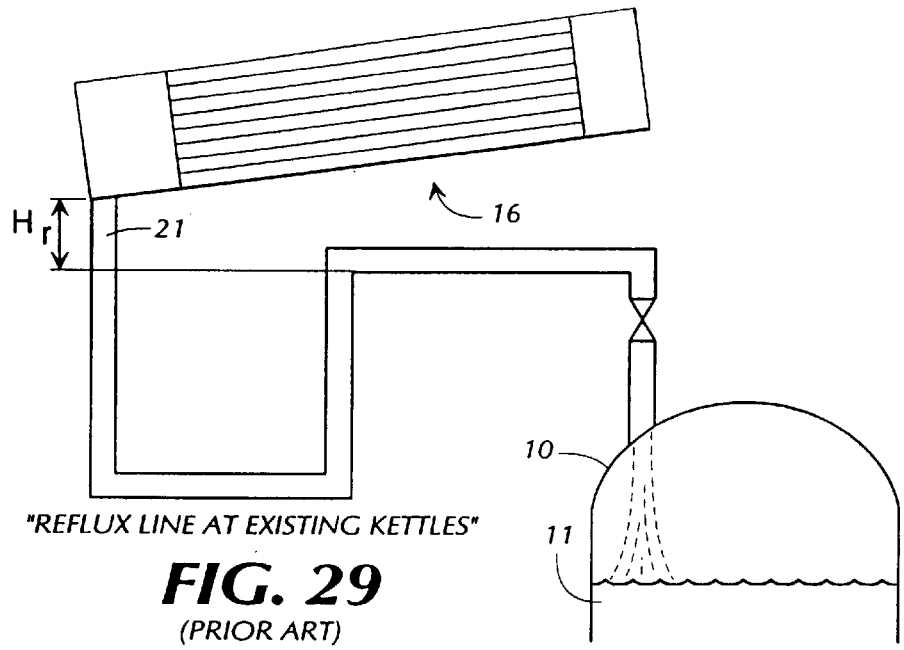
Figure 30:
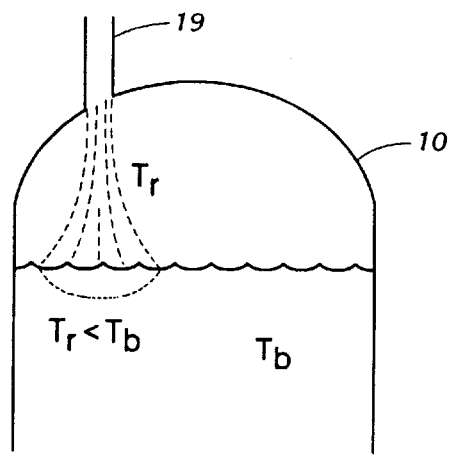
Figure 31:
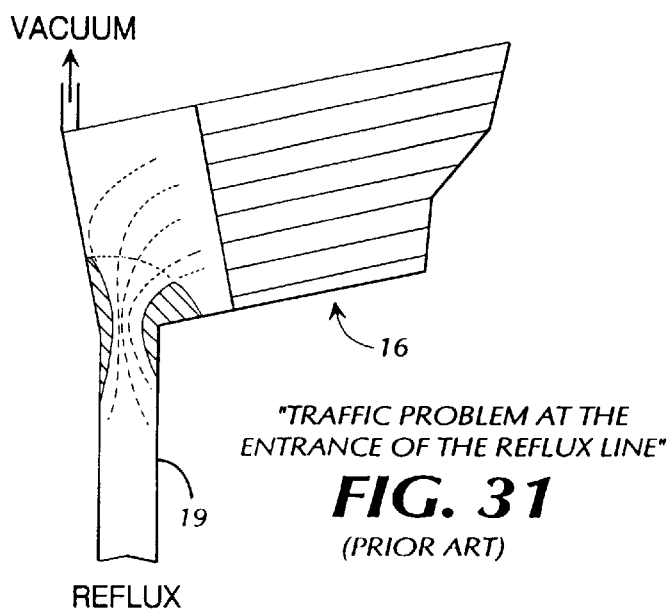
Figure 32:
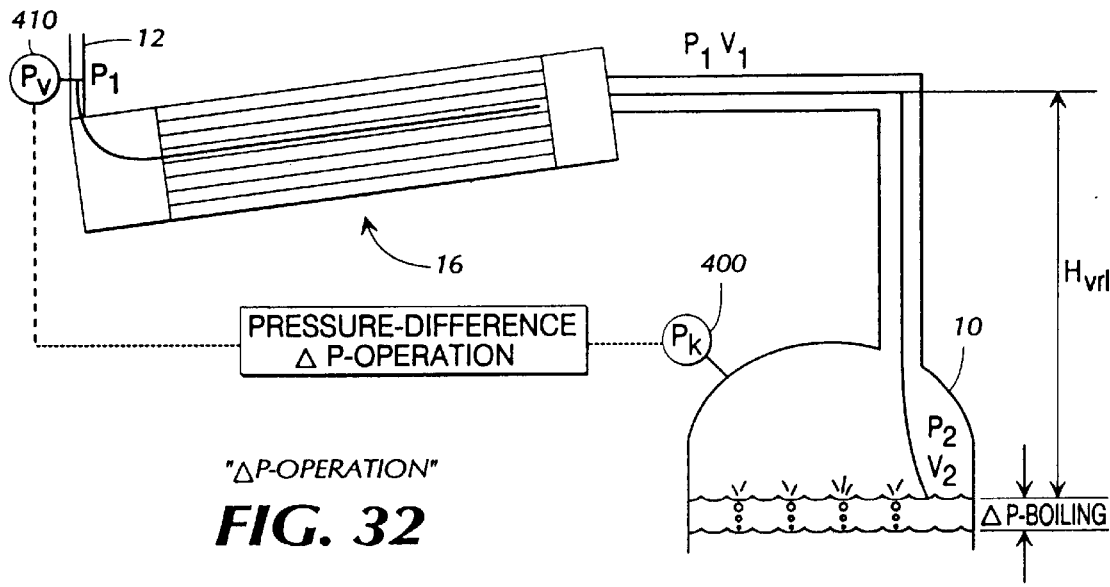
Figure 33:
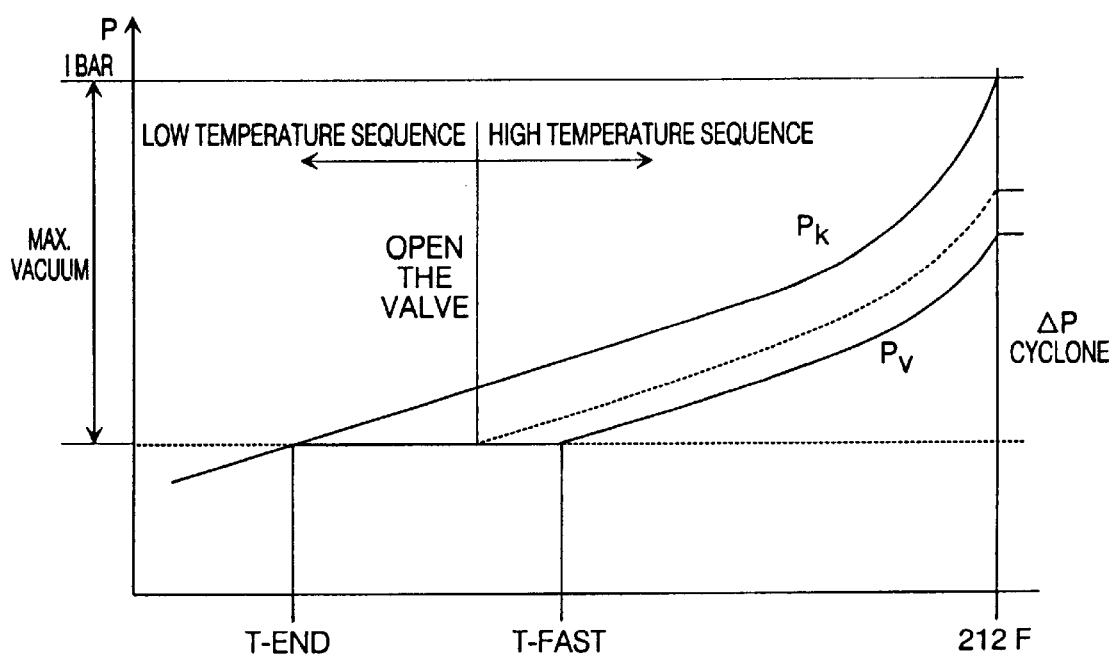
Figure 34:
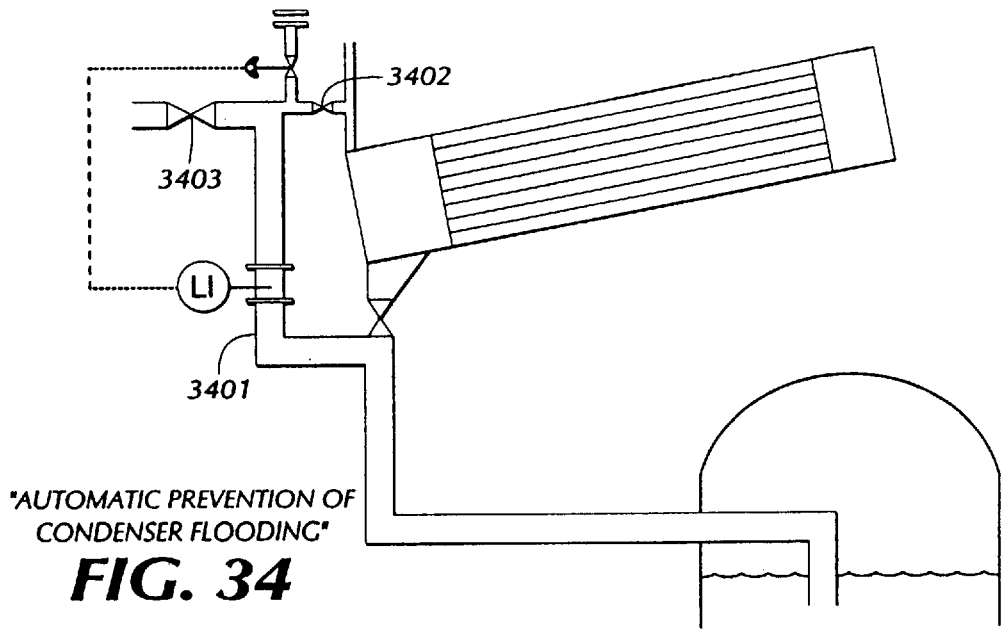
Figure 35:
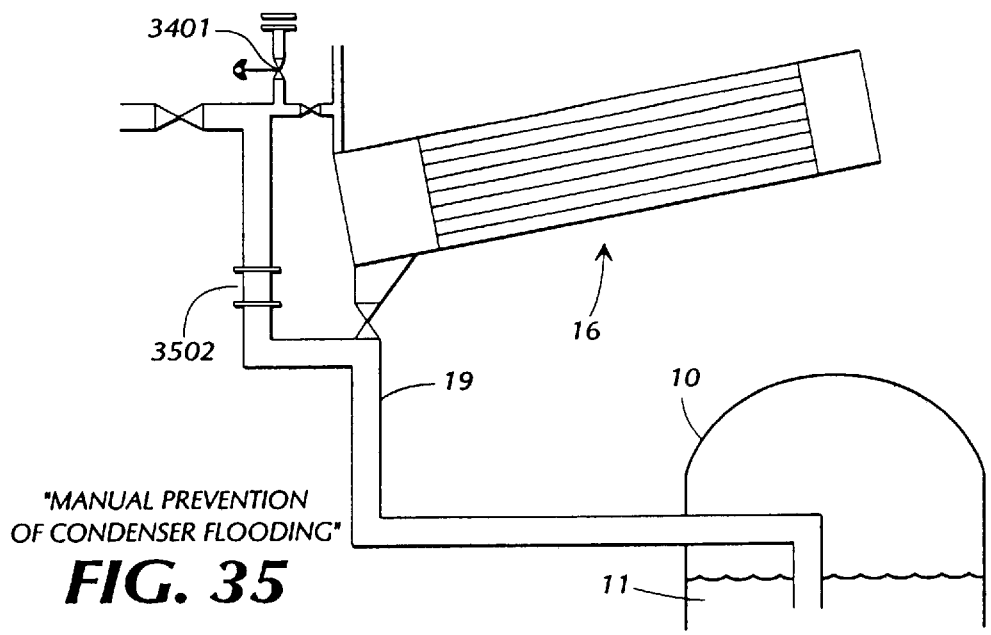

FIG. 29 is a schematic diagram of the reflux line design and configuration of existing condenser systems;

FIG. 30 is a schematic diagram of an existing kettle demonstrating the effect of returning reflux above the level of the liquid surface in the kettle;

FIG. 31 is a schematic diagram of an existing condenser system demonstrating the effect of reflux line design and configurations on condenser output;

FIG. 32 is a schematic diagram of a segment of the improved condenser system according to the present invention demonstrating the measurement of pressure differential between the vacuum line and the surface of the liquid in the kettle;

FIG. 33 is a graphic representation of the pressure temperature relationship of the kettle and vacuum line during the cooldown of the batch, demonstrating the process of cooling the batch in accordance with the present invention;

FIG. 34 is a schematic diagram of a means for automatic prevention of condenser flooding in accordance with the present invention; and FIG. 35 is a schematic diagram of a means for manual prevention of condenser flooding in accordance with the present invention.

Figure 36:
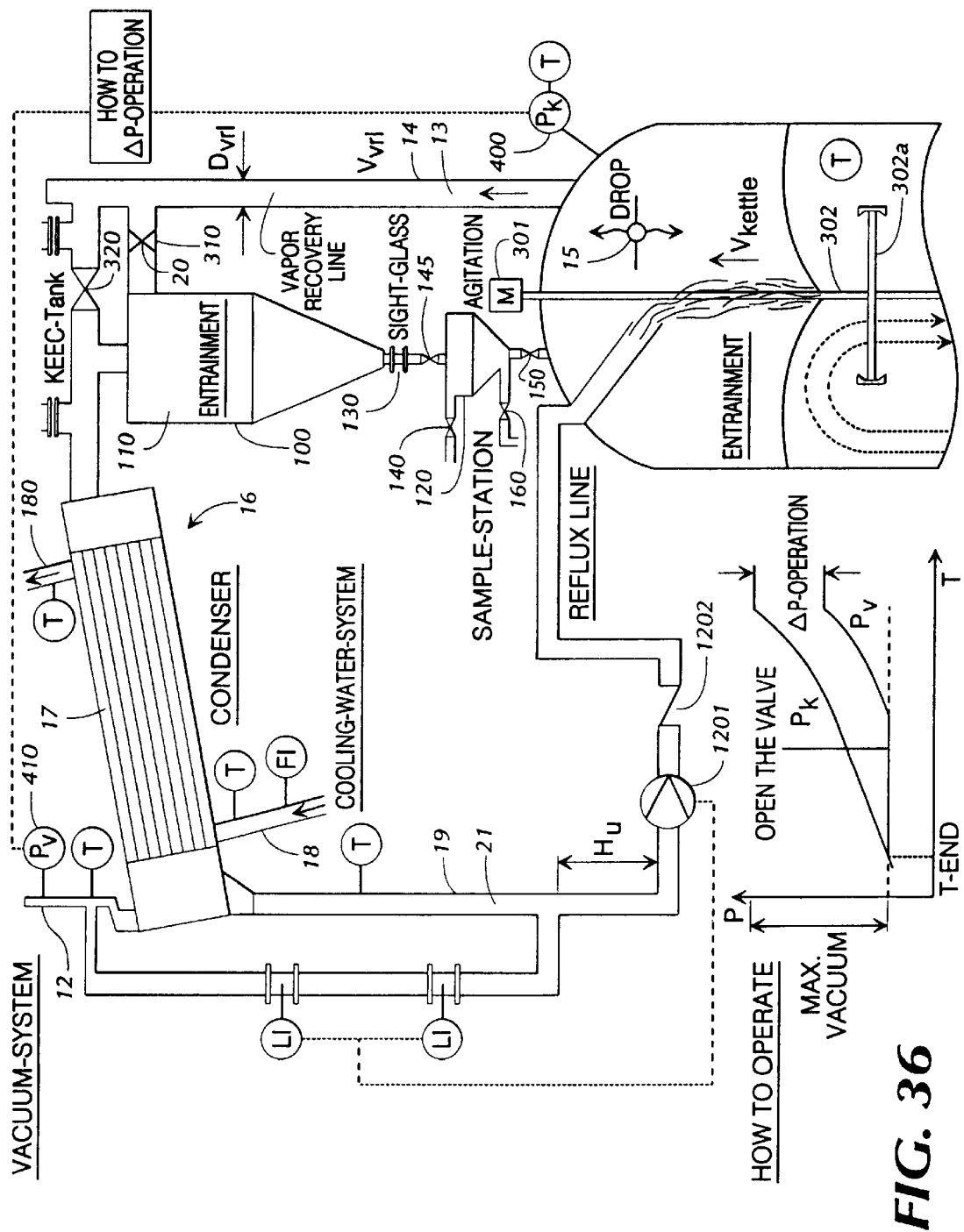

FIG. 36 is a schematic diagram of a preferred embodiment of the improved condenser system.

Figure 37:
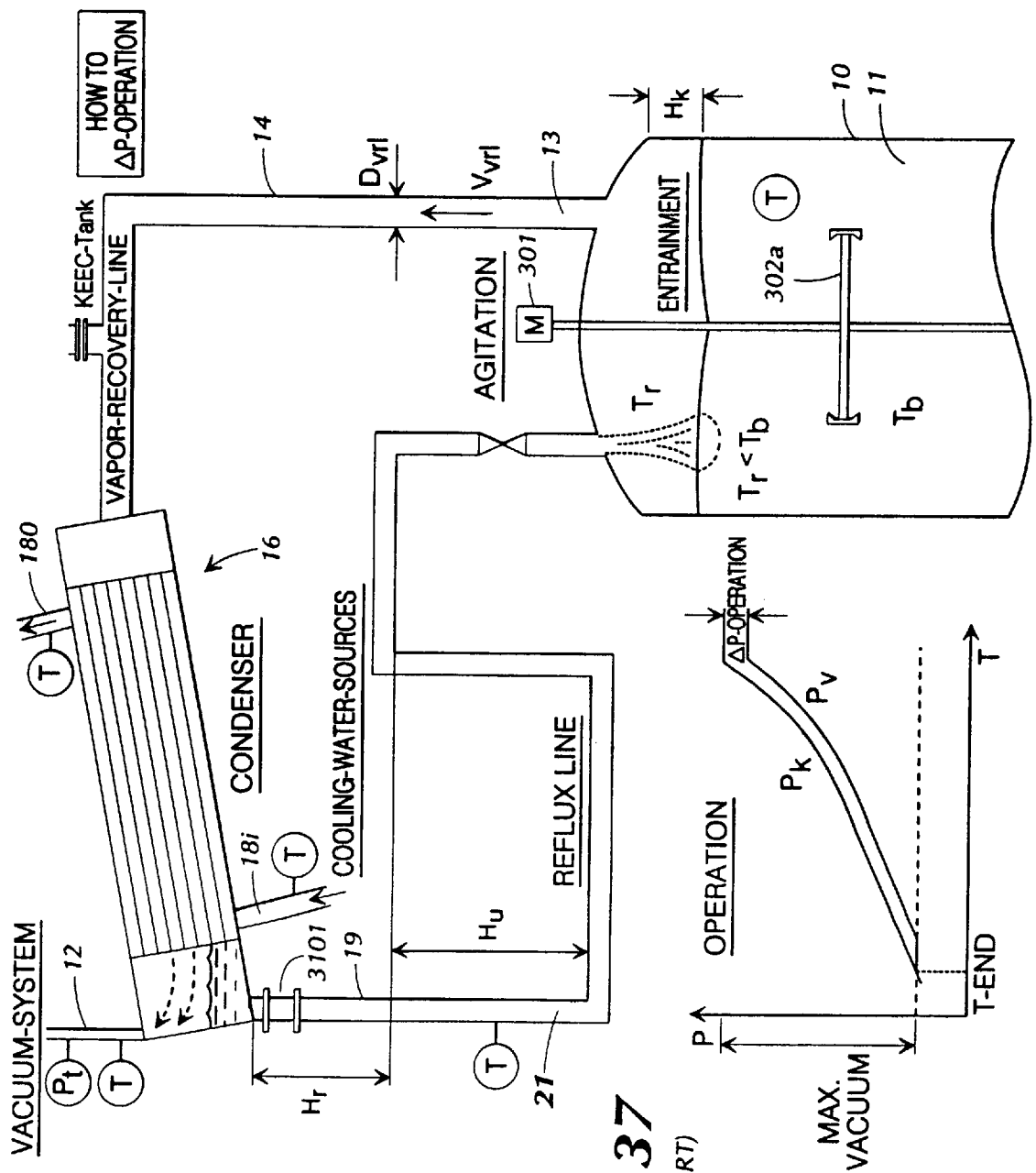

FIG. 37 is a schematic diagram of a prior art system.

DETAILED DESCRIPTION OF PREFERRED EMBODIMENTS

The following description sets forth the preferred embodiment of the improved condenser system according to the present invention. It will be understood that there are other embodiments of the present invention, and the scope of the present invention is not limited by the following description of the preferred embodiment.

A. The Entrainment Extractor System

The entrainment extractor is a device where the vapor 13 with the particles 15 will enter tangentially. It can be any kind of device like a cyclone 100 or cylindrical container.

As shown in Figure A, and referring to a resin reactor system as an example of the application of the present invention, a kettle 10 contains the batchcook 11. As the pressure difference created by the vacuum system pulls vapor 13 through the vapor recovery line 14, small particles 15 of sticky liquid resin (entrainment 15) are being torn off from the surface of the boiling batchcook 11 and are being carried with the vapor 13.

In the present invention, an entrainment extractor system 110 has been installed between the vapor recovery line 14 and the condenser 16 to separate the entrainment particles 15 from the vapor particles 13. The entrainment extractor system 110 substantially reduces the amount of resin droplets 15 entering the tubes 17 within the condenser 16. As a consequence, heat transfer from the collapsing vapor 13 to the coolant 18 circulating around the condenser tubes 17 is not impeded by the accumulation of entrainment 15, and the batchcook 11 is cooled efficiently. Once the vapor 13 is condensed, it is returned to the batchcook 11 by means of a reflux line 19.

Figure A depicts a preferred embodiment of this invention in which the mixture 20 of the vapor 13 and resin particles 15 travel from the vapor recovery line 14 into the entrainment extractor system 110. Upon tangentially entering the entrainment receptacle 110, the resin droplets 15 would be forced to run along the wall because of the centrifugal force (momentum of the droplets 15). The lighter vapor particles 13 rise out of the entrainment receptacle 110 and flow into the condenser tubes 17, but the heavier resin droplets 15 collect at the bottom of the entrainment receptacle 110 and flow into an entrainment collector 120. Both the entrainment receptacle 110 and the entrainment collector 120 can be heat traced to keep the viscosity of the resin 15 low.

A sight glass 130 is located between the entrainment collector 120 which allows the system's operator to detect an entrainment buildup or flow. When the entrainment collector 120 fills up, the accumulated entrainment 15 can be returned to the batchcook 11 by closing valve 145, and opening valve 150, and briefly opening valve 140, which allows air into the system and allows the accumulated resin to flow back into the batchcook 11. Additionally, resin samples can be collected by opening valves 160 and 140 and closing 150 and 145. The return of the resin could also be handled by an installation of a reflux line pipe like is used for the condensate, rather than a collector 120.

The preferred embodiment of this invention also includes a mechanism by which the resin and vapor mixture 20 can bypass the entrainment receptacle 110. It becomes necessary to bypass the entrainment receptacle 110 when no entrainment occurs anymore or the pressure differential between the vacuum line 12 and the kettle 10 decreases to a predetermined level. The predetermined level is a function of the size of resin droplets 15 or amount which can be permitted in any given condenser 16 without an unacceptable decrease in the efficiency of the heat transfer. The preferred embodiment includes pressure transmitters 400 at the kettle 10 and the vacuum source 410 to measure the pressure differential and to measure the absolute pressure at the kettle 10. At high batchcook 11 temperatures, the pressure is relatively high, and a high pressure difference between vacuum line 12 and kettle 10 is available to overcome the additional pressure drop through the entrainment extractor system 110 and to create a high vapor velocity responsible for a fast cooldown.

As the batchcook 11 cools, at low temperatures, the pressure in the kettle 10 decreases and the pressure differential available becomes too small to use an entrainment extractor system 110. As a result of the lower pressure differential, it becomes more difficult to create a high vapor velocity with use of an entrainment extractor system 110. By opening the valve 320 in the vapor recovery line 14, the pressure differential responsible for the kinetic energy is increased due to the overall exclusion of the entrainment extractor system 110 which causes an additional pressure differential. Additionally, a valve 310 may be desired to further isolate the entrainment extractor system 110 means when valve 320 is opened.

Now this additional pressure differential can be used to create a higher vapor velocity and quicken the cooldown at lower batch temperatures. Additionally, since lower batchcook temperatures result in fewer resin droplets 15 being torn from the batchcook surface, the need for the entrainment receptacle 110 is obviated.

B. The Improved Condenser System

1. The Improved Condenser System

The improved condenser system including the entrainment extractor system 110, is described in the following section.

2. Important Considerations in the Design of the Condenser System

Figure 1:
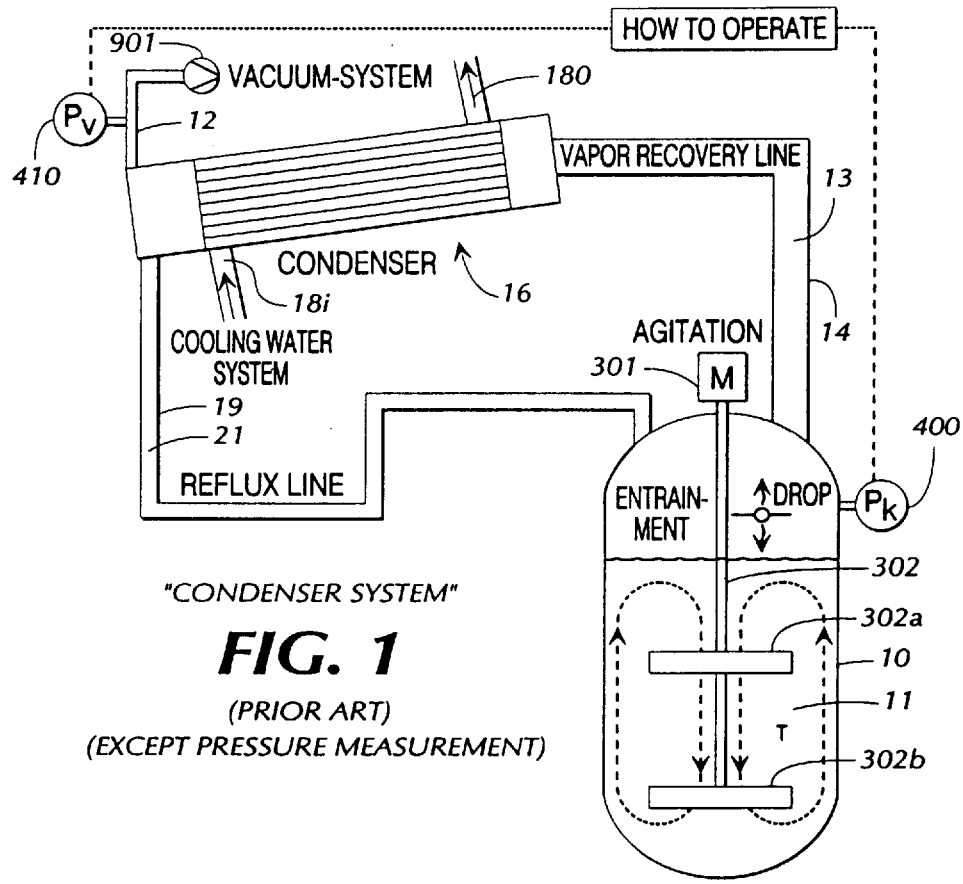
FIG. 1 is a schematic diagram of a condenser system showing an improved pressure measurement system.

Referring now to FIG. 1, to cool the batch 11 or relieve an exothermic reaction, pressure in the kettle 10 is decreased, so that the batch 11 starts boiling at a lower temperature. The vapor 13 goes into the condenser 16 and condenses to liquid (reflux) 21, while the coolant 18 takes up the latent heat. The liquid (reflux) 21 will return to the kettle 10. The batch 11 cools down as you relieve the pressure even more to vaporize liquid at a lower temperature and the cycle starts again.

In the cycle you have to consider the following;
1. Agitation
2. Entrainment 15
3. Vapor Recovery Line 14
4. Condenser 16
5. Coolant System
6. Vacuum System
7. Design of the Reflux Line 19
8. How to Operate
2.1 The "Chain" of Equipment Because of this operation cycle, it is very important to design all parts of the condenser system so they are well balanced.

Figure 2:
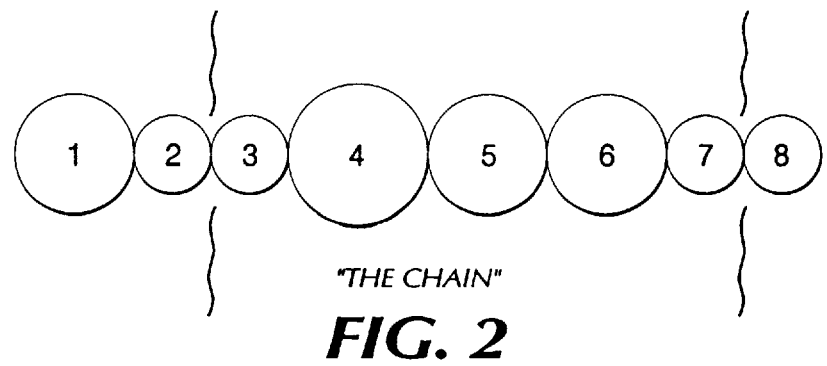
FIG. 2 is a second schematic diagram demonstrating the interrelationship of the elements of the system which must be considered and improved in accordance with the teaching of the present invention.

To realize the importance of all parts you can look at the system like a chain as shown in FIG. 2.

The chain will break at the weakest part and the system is not able to cool the batch 11 faster, even if you design the rest of the system very well.

The Weakest Part Will Rule the System!

Each link in this "chain" is discussed in the following paragraphs.

2.2 The Condenser System 2.2.1 Agitation

Figure 3:
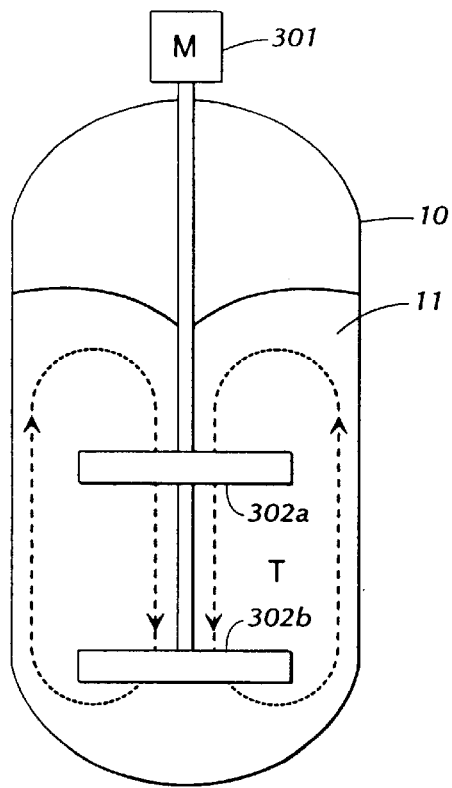
FIG. 3 is a schematic diagram of an existing means for agitation of the batch contained in the kettle.

Referring now to FIG. 3, to get a homogeneous temperature in the kettle 10 and to mix the cold reflux 21 with the contents 11 of the kettle 10, it is necessary to agitate the batch 11 very well.

Considerations

Figure 4:
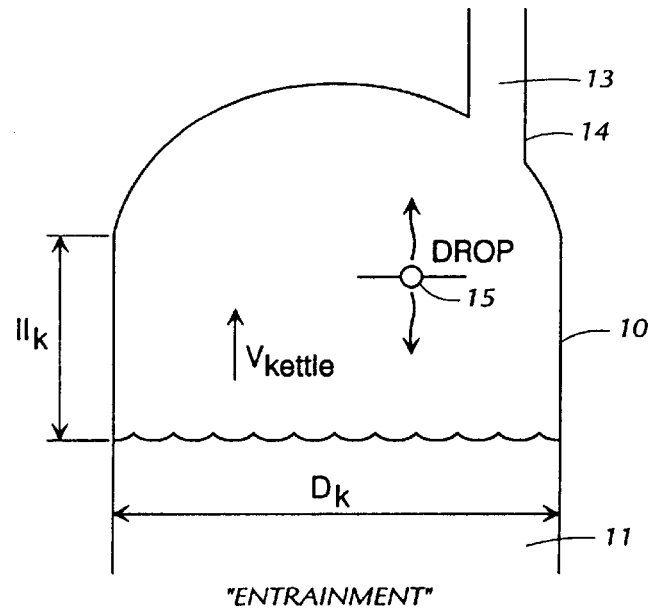
FIG. 4 is a schematic diagram of an existing kettle demonstrating the effect of kettle head vapor velocity and kettle head space height on entrainment.

1. Horsepower of the motor 301 (Turbulent flow—high Reynold's Number)
2. Design of the blades 302a and 302b 2.2.2 Entrainment Referring now to FIG. 4, entrainment is the inclusion of particles 15 in the vapor 13 entering the vapor recovery line 14. This occurs because of the velocity in the system.

Considerations

1. Height $H_r$ between boiling surface and kettle head

Since the surface is boiling, the acceleration of the vapor 13 from the surface to its final velocity tears off small droplets 15 into the vapor 13. There is a critical dropsize that depends on the final kettle headspace, vapor velocity, and the headspace height $H_k$. Droplets 15 bigger than the critical dropsize will settle back down to the batch surface 11. Smaller droplets 15 will follow the vapor 13 into the vapor recovery line 14. The critical dropsize decreases and fewer droplets 15 are entrained as the height $H_k$ of the kettle headspace is increased. This is because the droplets 15 must stop accelerating and reach a terminal velocity before gravitational force can cause them to settle. The smaller the terminal headspace velocity, the smaller is the critical dropsize.

To calculate the kettle head space height $H_k$ research needs to be done to determinate how much height is needed for the acceleration and how much height is necessary so the droplets 15 settle down.

2. Diameter of the kettle 10

Figure 5:
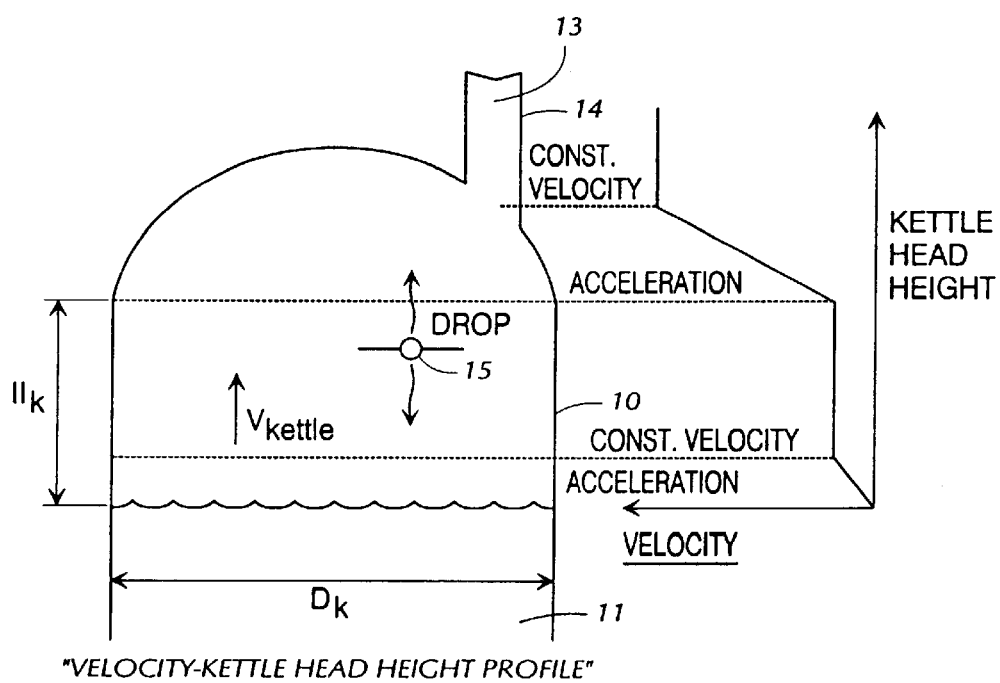
FIG. 5 is a further schematic diagram of an existing kettle demonstrating the effect of kettle vapor velocity and kettle space height on entrainment.

Referring now to FIG. 5, to get the smallest velocity in the kettle 10 and hence the smallest dropsize of entrained particles 15 that would go into the vapor recovery line 14, it is important to design the diameter of the kettle 10 as large as possible.

$$m = d \cdot A_k \cdot W_k \tag{1}$$

$$W_k = \frac{m}{(A_k \cdot d_v)} \tag{2}$$

m=Massflow, lbs/sec
d=Density of vapor, lbs/ft³
$A_k$=Area of kettle, ft²
$W_k$=Velocity in the kettle, ft/sec Another advantage is that you are able to get a higher rate of vapor 13 (Equation 3) from the boiling surface of the batch 11. The droplets 15 have to go through the boiling surface to vaporize.

$$m = C(T,P) \cdot A_b \tag{3}$$

m=Massflow, lbs/min
C=Constant at T and P, lbs/(min·ft²)
$A_b$=Boiling surface area, ft²

If the boiling surface area is larger, you are able to vaporize more liquid.

3. Dropsize

In the manufacture of processing batch 11, it is important to minimize entrainment to prevent fouling the condenser 16 (bad heat transfer coefficient) and coating the walls of the whole system (higher friction factor causes higher pressure drop in the system).

The maximum drop size that is entrained in the vapor recovery line 14 can be estimated by Stokes's law $$D_p = \frac{18 \cdot \mu \cdot W_k}{g \cdot (d_p - d_v)} \tag{4}$$

$$Re = \frac{D_p \cdot W_k \cdot d_v}{\mu} \tag{5}$$

$D_p$=Diameter of droplet, ft
$\mu$=Fluid viscosity, lbs/(ft·sec)
$W_k$=Velocity in the kettle, ft/sec
g=Gravity, ft/sec²
$d_p$=Density particle, ft³/lbs
$d_v$=Density of vapor, ft³/lbs
Re=Reynold's Nr As mentioned before, the height $H_k$ between the boiling surface and the kettle head (time to settle down) and also the kettle diameter itself (smaller or larger head space velocity) have a high influence in this case.

4. Foaming

It is necessary to prevent foaming on the boiling surface. The foam could easily tear off the boiling surface and move into the vapor recovery line 14 and foul the system.

2.2.3 Vapor Recovery Line
Considerations
1. Diameter of Vapor Recovery Line

Figure 6:
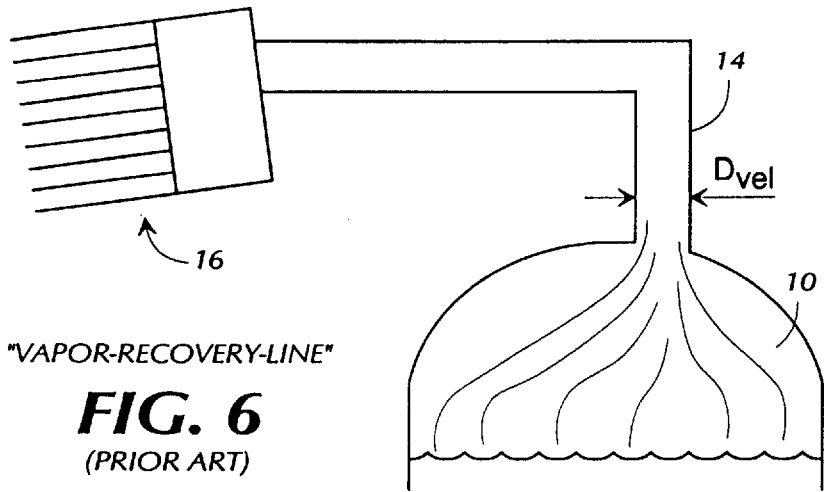
FIG. 6 is a schematic diagram of in existing vapor recovery line demonstrating the effect of vapor recovery line design on system operation.

Referring now to FIG. 6, because of the pressure drop in the vapor recovery line 14, it is very important to design the diameter of this line as large as possible.

$$DP_{fv} = \frac{d_v}{2} \cdot W_v^2 \cdot \left( \varsigma + \frac{f_v \cdot L_v}{D_v} \right) \tag{6}$$

$DP_{fv}$=Pressure drop in the vapor recovery line, lbs/(ft·sec²)
$d_v$=Density of vapor, lbs/ft³
$\varsigma_v$=Additional friction loss in vapor recovery line
$f_v$=Friction factor in the vapor recovery line
$W_v$=Velocity in the vapor recovery line, ft/sec
$L_v$=Length of vapor recovery line, ft
$D_v$=Diameter of vapor recovery line, ft This way you will have more pressure difference available to produce kinetic energy and drive the massflow.

Although less pressure drop helps the design of the reflux line 19, less pressure drop needs less effective height between the kettle head and condenser 16.

2.2.4 Condenser

Figure 7:
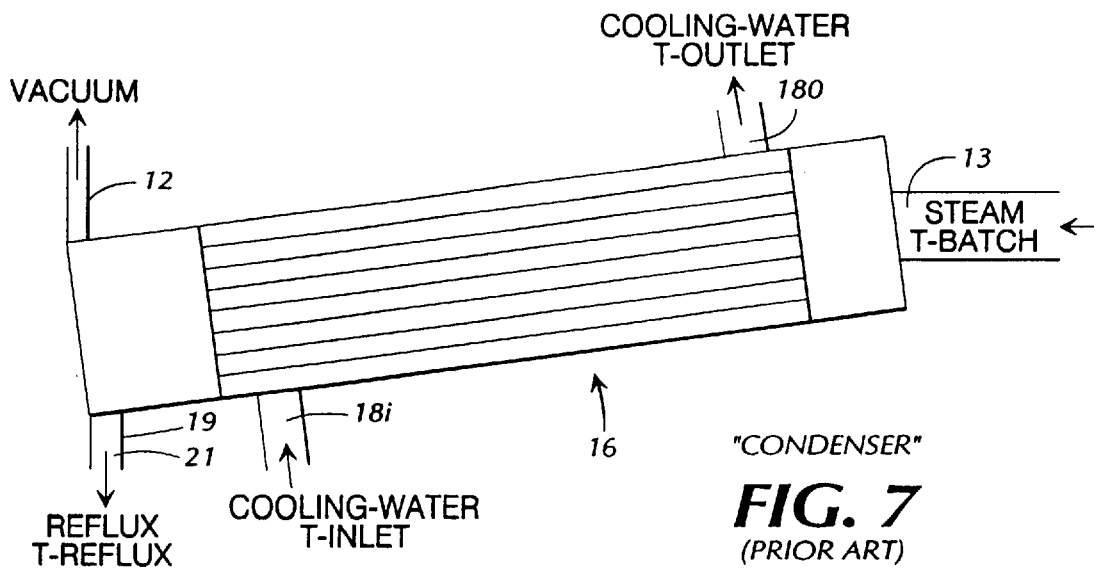
FIG. 7 is a schematic diagram of an existing condenser demonstrating the interrelationship of the various elements of condenser system design and configuration on system operation.

Referring now to FIG. 7, to handle the condensation of the vapor 13, vapor 13 released by the reaction, the latent heat has to go from the vapor 13 to the coolant system.

Considerations
1. Large Heat Transfer Area
2. High Heat Transfer Coefficient (less entrainment—less fouling)
3. High Log Mean Temperature Difference Low coolant inlet temperature 18i and a high massflow of coolant 18 keeps the outlet temperature of the coolant 18o small and provides a higher Log Mean Temperature Difference.

$$Q_c = U_c \cdot A_c \cdot DT_{log} \tag{7}$$

$$DT_{log} = \frac{(T_o - T_i)}{\log \frac{(T_b - T_i)}{(T_b - T_o)}} \tag{8}$$

$Q_c$=Condenser cooling rate, Btu/hr
$U_c$=Heat transfer coefficient, Btu/(ft²·°F.·hr)
$DT_{log}$=Log Mean Temperature Difference, °F.
$A_c$=Condenser cooling area, ft²
$T_b$=Batch temperature, °F.
$T_i$=Coolant inlet temperature, °F.
$T_o$=Coolant outlet temperature, °F.

2.2.5 Coolant System

Figure 8:
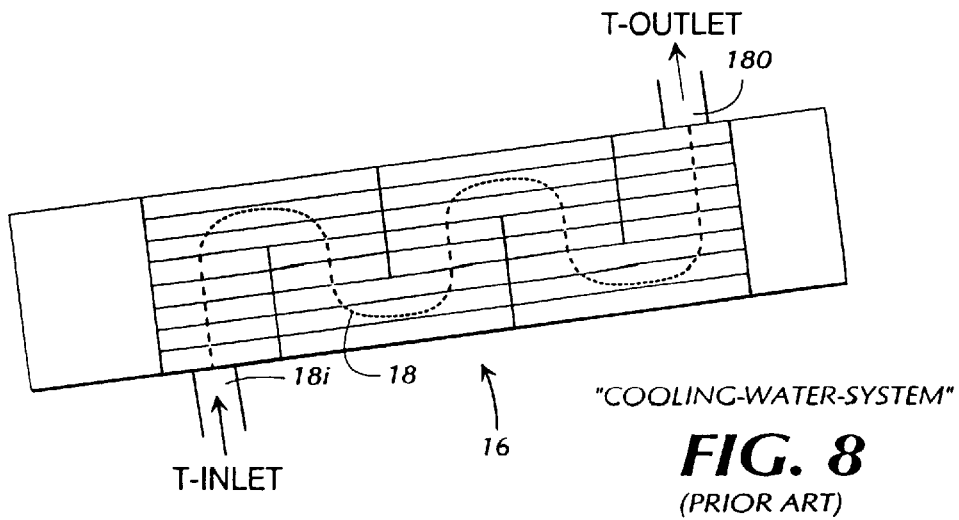
FIG. 8 is a further schematic diagram of an existing condenser cooling system demonstrating the effect of condenser design on condenser efficiency.

Referring now to FIG. 8, the coolant system has to handle the heat transfer through the tubes 17 in the condenser 16.

Considerations
1. Inlet temperature

Provides a high Log Mean Temperature Difference, the lower the temperature.

2. Massflow

Coolant outlet temperature 18o is decreasing with a higher coolant 18 massflow and provides a higher Log Mean Temperature Difference.

$$Q_c = Q_{cw} = m_{cw} \cdot cp_{cw} \cdot (T_o - T_i) \tag{9}$$

$Q_c$=Condenser cooling rate. Btu/min
$Q_{cw}$=Coolant cooling rate, Btu/min
$m_{cw}$=Massflow coolant, lbs/min
$cp_{cw}$=Specific heat of coolant, Btu/(lbs·°F.)
$T_i$=Coolant inlet temperature, °F.
$T_o$=Coolant outlet temperature, °F.

3. Velocity and design

To improve the heat transfer coefficient, it is necessary to have a high velocity (high Reynold's Nr.) around the tubes 17 and crossflow through the tube bundle.

2.2.6 Vacuum System

Figure 9:
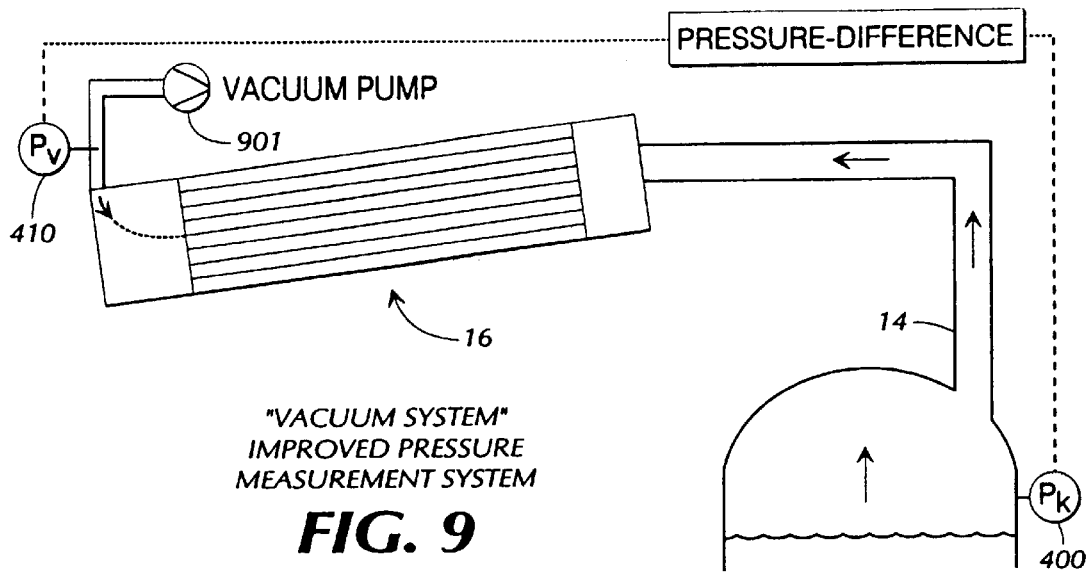
FIG. 9 is a schematic diagram of an improved condenser system according to the present invention showing the means for measurement of the pressure differential established by the pump means and the kettle.

Referring now to FIG. 9, the vacuum pressure $P_v$ controls the driving force of the condenser system because it creates a pressure difference in the condenser 16 and vapor recovery line 14.

Considerations

1. Vacuum pumps

To cooldown to a very low temperature, the vacuum pumps 901 needs to be designed so that you get the highest vacuum in the kettle 10.

Also it is important to reach a certain pressure in the kettle 10 as soon as possible, to provide the kettle 10 with cooling.

2. Leaks

Leaks in the condenser system decrease the rate and maximum vacuum in the system.

2.2.7 Design of the Reflux Line

Figure 10:
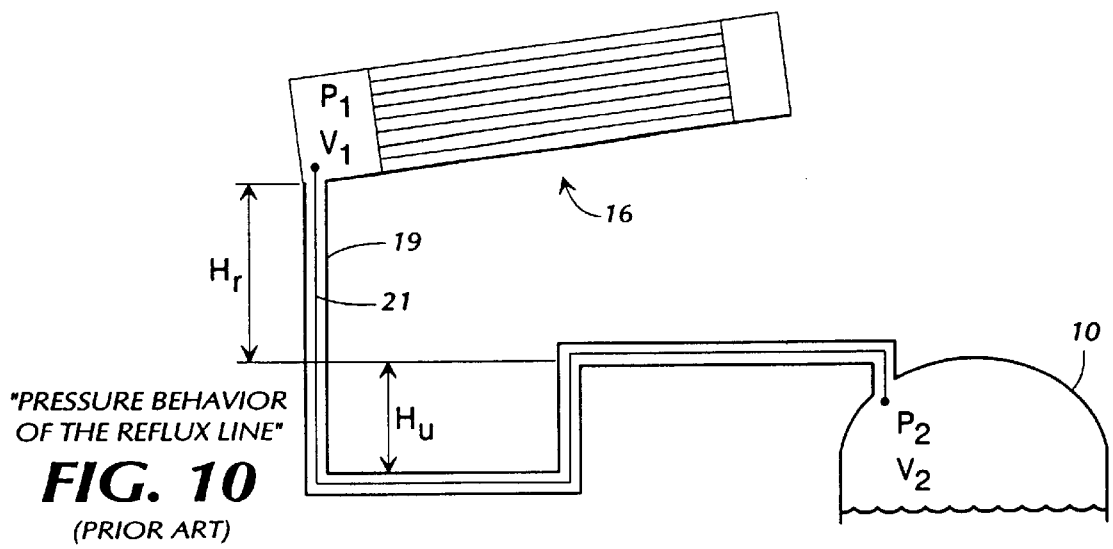
FIG. 10 is a schematic diagram of an existing condenser system demonstrating the effect of reflux line design on condenser system operation.

Referring now to FIG. 10, the reflux line 19 needs to be designed so that it can manage any massflow 21 coming out of the condenser system. This is very important during a run away reaction, because you have to handle a high massflow and a high pressure difference in the condenser system.

$$P_1 + d_r \cdot g \cdot H_r + d_r/2 \cdot W_1^2 = P_2 + d_r \cdot g \cdot H_2 + d_r/2 \cdot W_2^2 + DP_{fr} \quad (10)$$

Assumption $W_1=0$ $H_2=0$ $$DP_{fr} = \frac{d_r}{2} \cdot W_r^2 \cdot \left( \varsigma_r + \frac{f_r \cdot L_r}{D_r} \right) \quad (11)$$

$$P_2 - P_1 = DP\text{-Operation} = DP_{sys} \quad (12)$$

$$H_r = \frac{DP_{sys} + \frac{d_r}{2} \cdot W_r^2 \cdot \left( 1 + \varsigma_r + \frac{f_r \cdot L_r}{D_r} \right)}{d_r \cdot g} \quad (13)$$

$P_1$=Pressure at the entrance of the reflux line, lbs/(lbs·sec$^2$)

$P_2$=Pressure in the kettle, lbs/(ft·sec$^2$)

$DP_{fr}$=Pressure drop through the reflux line, lbs/(ft·sec$^2$)

$d_r$ =Density of the reflux, lbs/ft$^3$ $\varsigma_r$=Additional friction loss in the reflux line $f_r$=Friction factor in the reflux line $W_1$=Velocity at the entrance of the reflux line, ft/sec $W_2$=Velocity through the reflux line, ft/sec $L_r$=Length of the reflux line, ft $D_r$=Diameter of the reflux line, ft g=Gravity, ft/sec$^2$ $H_r$=Efficient height between kettle head and condenser, ft Considerations 1. Max. height $H_r$ between boiling surface and condenser 16

The pressure difference in the system (vapor recovery line 14, condenser 16, DP-boiling) will suck a liquid column to a certain height in the reflux line 19. To overcome this, we need additional height to get the kinetic energy and overcome the friction in the reflux line 19, in order to permit reflux 21 to flow back to the kettle 10.

The reflux line height $H_r$ should be designed so that it can handle more pressure difference at an improved condenser cooling performance and, as mentioned before, handle the higher pressure difference and a higher massflow at a run away reaction.

Proposal for design a. Referring now to FIG. 11, reflux line 19 leads into the batch 11 which gives the maximum height between boiling surface and reflux entrance.

b. Referring now to FIG. 12, another solution would be to install a pump 1201. The pump 1201 can handle any massflow coming out of the condenser 16. The check valve 1202 will close the reflux line 19 when the pressure difference in the system occurs.

2. No disturbance of the surface boiling

The cold reflux 21 should go right into the middle of the contents of the kettle 10 to cooldown the batch 11 and get a homogeneous temperature.

Referring now to FIG. 13, if the cold liquid particles 15 drop on the boiling surface, there is a cooldown of a certain area of the boiling surface. This cooler area of the surface would need even higher vacuum to vaporize the liquid. Consequently, there is a decrease in the actual surface boiling area.

Proposal for design a. Referring now to FIG. 14, reflux line 19 leads into the content of the batch 11 and will be mixed right away with the agitation.

b. As shown in FIG. 15, if a pump 1201 is installed in the reflux line 19, the return line entering the kettle 10 should lead to the shaft 302 of the agitator. The cold reflux 21 runs down the shaft 302 and will be mixed with the batch 11 right away.

3. Prevention of pulling vacuum through the reflux line 19

Referring now to FIG. 16, to prevent this happening, the reflux line 19 is designed with a U-Loop, called the "Hartford" loop.

If the liquid content in the U-loop is large enough to create a liquid column to overcome the pressure difference in the system, it is not possible to pull vacuum backwards through the reflux line 19.

$$H_u = \frac{DP_{sys}}{(d_r \cdot g)} \quad (14)$$

$$V_u = H_u \cdot A_r \quad (15)$$

$H_u$=Height of the liquid column, ft $DP_{sys}$=Pressure difference in the system, lbs/(ft·sec$^2$)

$d_r$=Density of the reflux, lbs/ft$^3$ g=Gravity, ft/sec$^2$ $V_u$=Volume in the U-Loop, ft$^3$ $A_r$=Area of the reflux line, ft$^2$ Referring again to FIG. 14, another alternative is to place the end of the reflux line 19 into the liquid of the batch 11. It is not possible to pull vacuum through the reflux line 19 and you do not need the U-Loop.

The batch 11 seals the end of the reflux line 19 from vacuum.

4. Keep the reflux line 19 clean

It is essential that the reflux line 19 stays clean and has no possibility of blockage. Blockage could cause a dangerous situation, because the condenser system would lose its cooling capacity.

Referring to FIG. 17, a proposal for design:

Close valve 1701, 1702 and open valve 1703. Now run a caustic solution through the reflux line 19 to clean the pipe.

5. Prevention of condenser 16 flooding

This is a very important point. When the condenser 16 is flooded, there will be a decrease in the efficiency of the condenser 16 immediately, thus decreasing the capacity of the condenser 16.

Referring now to FIG. 18, vapor 13 will only enter and condense through the upper tubes 1801. The tubes 1802 below the liquid level will not be used for cooling or condensing anymore. The efficient (effective) area of the condenser 16 is getting smaller. Also vapor breakthrough (when vapor 13 goes through the tubes 17 and does not condense) occurs easier at this point. The temperature in the reflux line 19 will be very high, because you do not subcool the reflux 21 anymore (less area for cooling).

The reason for this effect is an improper design of the reflux line 19. The reflux line 19 cannot handle the pressure difference in the condenser system and the high massflow.

Since both a high pressure difference and a high massflow occur during a run away reaction, the reflux line height Hr should be designed to handle this. Condenser 16 flooding must be prevented both to run the batch 11 more efficiently and safely.

Referring now to FIG. 19, a proposal for design is shown.
a. Prevention of condenser 16 flooding with a level indicator 1901 and control valve 1902.
b. Referring now to FIG. 20, prevention of condenser 16 flooding with level indicator 2001 and 2002 and pump 1201 installation is shown.

6. Traffic Problem

The condensed liquid (reflux) 21 is typically coming out of more than 500 condenser tubes 17. At the end of the condenser 16 the reflux 21 needs to be efficiently collected before it enters the reflux line 19. This prevents a higher friction factor and foaming in the entrance of the reflux line 19.

Referring now to FIG. 21, a proposal for design is shown.

2.2.8 How to operate

Referring now to FIG. 22, the key to controlling and regulating the cooling capacity of the condenser system is as follows.

The driving force for the cooling performance is the pressure difference in the vapor recovery line 14. This pressure difference is responsible for the massflow through the condenser system and the massflow is responsible for the cooling capacity.

$$P_3 + d_v \cdot g \cdot H_v + d_v/2 \cdot W_3^2 + DP_b + DP_{fv} = P_2 + d_v \cdot g \cdot H_2 + d_v/2 \cdot W_2^2 \quad (16)$$

Assumption
$W_2 = 0$
$H_2 = 0$ $$d_v \cdot g \cdot H_v = 0$$

$$DP_{fv} = \frac{d_v}{2} \cdot W_3^2 \cdot \left( \varsigma_v + \frac{f_v \cdot L_v}{D_v} \right) \quad (17)$$

$$P_2 - P_3 = d_v/2 \cdot W_3^2 + DP_{fv} + DP_b = DP_{2-3} \quad (18)$$

$$DP_{2-1} = P_2 - P_1 = DP_{2-3} + DP_c \quad (19)$$

$$DP_{2-1} = \frac{d_v}{2} \cdot W_3^2 \cdot \left( 1 + \varsigma + \frac{f_v \cdot L_v}{D_v} \right) + DP_b + DP_c \quad (20)$$

$P_3$=Pressure at the entrance of the condenser, lbs/(ft·sec²)
$P_1$=Pressure at the entrance of the reflux line, lbs/(ft·sec²)
$P_2$=Pressure in the kettle, lbs/(ft·sec²)
$DP_{2-1}$=Pressure difference in the system (DP–Operation), lbs/(ft·s²)
$DP_{fv}$=Pressure drop in the vapor recovery line, lbs/(ft·sec²)
$DP_b$=Driving force to boil the liquid in the batch, lbs/(ft·sec²)
$DP_c$=Pressure drop through the condenser, lbs/(ft·sec²)
$d_v$=Density of vapor, lbs/ft³
$\varsigma_v$=Additional friction loss in the vapor recovery line
$f_v$=Friction factor in the vapor recovery line
$W_3$=Velocity in the vapor recovery line, ft/sec
$W_2$=Velocity at the boiling surface, ft/sec
$L_v$=Length of the vapor recovery line, ft
$D_v$=Diameter of the vapor recovery line, ft
g=Gravity, ft/sec²
$H_v$=Height of the vapor recovery line, ft For a certain massflow (cooling rate) you need the pressure difference in the vapor recovery line 14 required for the following:
a) kinetic energy $$DP_{kin} = d_v/2 \cdot W_v^2 \quad (21)$$

$DP_{kin}$=Pressure difference for the kinetic energy, lbs/(ft·sec²)
$d_v$=Density of vapor, lbs/ft³
$W_v$=Velocity in the vapor recovery line, ft/sec b) pressure drop in the system $$DP_{fv} = \frac{d_v}{2} \cdot W_v^2 \cdot \left( \varsigma_v + \frac{f_v \cdot L_v}{D_v} \right) \quad (22)$$

$DP_{fv}$=Pressure drop in the vapor recovery line, lbs/(ft·sec²)
$d_v$=Density of vapor, ft³
$\varsigma_v$=Additional friction loss in the vapor recovery line
$f_v$=Friction factor in the vapor recovery line
$W_v$=Velocity in the vapor recovery line, ft/sec
$L_v$=Length of the vapor recovery line
$D_v$=Diameter of the vapor recovery line, ft c) to boil the liquid surface
$DP_b$=Driving force to vaporize the liquid to vapor through the boiling surface d) pressure drop through the condenser 16
$DP_c$=Pressure drop through the condenser 16, based on lost of kinetic energy and reflux 21 run through the tubes 17

To keep the batch 11 at a target temperature, set the pressure in the kettle 10 equal to vapor pressure of the boiling content at that temperature. By doing so the batch content 11 will boil immediately if the batch temperature rises above the set point temperature (set point pressure). If there is a strong exothermic reaction and the heat creation is known, then it will also be known how much cooling rate is necessary to keep the batch 11 at a certain temperature. From the known cooling rate, we can calculate the pressure difference in the condenser system required to cool the overshooting exothermic reaction. For the final cooldown at the end of the cook, each condenser system has an optimum pressure batch temperature profile. This profile is a function of the condenser system dimensions.

$$d_r \cdot g \cdot H_r = DP_{sys} + d_r/2 \cdot W_r^2 + DP_{fr}(W_r^2) \quad (23)$$
$$DP_{sys} = d_v/2 \cdot W_v^2 + DP_{fv}(W_v^2) + DP_c(W_v^2) + DP_b(W_v^2) \quad (24)$$

with $$W_r \cdot d_r \cdot A_r = W_v \cdot d_v \cdot A_v = m = \text{constant} \quad (25)$$
$$W_v(W_r) = C(T) \cdot W_r \quad (26)$$

as follows, $$d_r \cdot g \cdot H_r = d_r/2 \cdot C(T)^2 \cdot W_r^2 + C(T)^2 \cdot DP_{fv}(W_r^2) \cdot C(T)^2 \cdot DP_c \cdot (W_r^2) + C(T)^2 \cdot DP_b(W_r^2) + d_r/2 \cdot W_r^2 + DP_{fr}(W_r^2) \quad (27)$$

$$d_r \cdot g \cdot H_r = C_1(T, W_r) \cdot W_r^2 \quad (28)$$

$$Q_c = m \cdot h = W_r \cdot d_r \cdot A_r \cdot h \quad (29)$$

$$W_r(Q_c) = C_2(T) \cdot Q_c \quad (30)$$

with equation (28) and (30) follows, $$d_r \cdot g \cdot H_r = C_1(T, W_r) \cdot C_2(T)^2 \cdot Q_c^2 \quad (31)$$

now you get the equation for the height $H_r$ in regard of the cooling rate $Q_c$, $$H_r(Q_c) = C_3(T, W_r) \cdot Q_c^2 \quad (32)$$

and the equation for the cooling rate $Q_c$ in regard of the height $H_r$ in the reflux line 19, $$Q_c(H_r) = C_3(T, W_r) \cdot (H_r)^{0.5} \quad (33)$$

$DP_{sys}$=Pressure difference in the condenser system (DP-Operation), lbs/(ft·sec$^2$)

$DP_{fr}$=Pressure drop in the reflux line, lbs/(ft·sec$^2$)

$DP_{fv}$=Pressure drop in the vapor recovery line, lbs/(ft sec$^2$)

$DP_b$=Pressure difference for the boiling driving force, lbs/(ft·sec$^2$)

$DP_c$=Pressure drop through the condenser, lbs/(ft·sec$^2$)

$d_v$=Density of the vapor, lbs/ft$^3$ $d_r$=Density of the reflux, lbs/ft$^3$ $W_v$=Velocity in the vapor recovery line, ft/sec $W_r$=Velocity in the reflux line, ft/sec $A_r$=Area of the reflux line, ft$^2$ $A_v$=Area of the vapor recovery line, ft$^2$ g=Gravity, ft/sec$^2$ $H_r$=Efficient height of the reflux line, ft $Q_c$=Cooling rate, Btu/sec h=Latent heat, Btu/lbs m=Massflow through the condenser, lbs/sec C(T)=Constant depend on temperature $C_1(T,W_r)$=Constant depend on temperature and reflux line velocity $C_2(T)$=Constant depend on temperature $C_3(T,W_r)$=Constant depend on temperature and reflux line velocity 2.3 Case of an Emergency (Run Away Reaction)

In case a batch 11 is getting out of control (run away reaction) the temperature and pressure can exceed 212° F. and 1 atmosphere, respectively.

At this point there is a critical need to get a high pressure difference in the system, especially if the operators pull vacuum.

It is necessary that the system still would work in this extreme situation.

Also it is very important that flooding of the condenser 16 be prevented and that there is the maximum height $H_r$ between boiling surface and condenser 16 available to handle the high pressure difference and the high massflow through the system.

3. Improved Entrainment Proposal

Referring now to FIG. 24, low entrainment 15 is the key to cooling down the batch 11 faster and shortening the cooktime.

If you separate the entrainment 15 from the vapor 13 you are allowed to pull more vacuum (pressure difference) for the kinetic energy. You get a higher velocity and thereby a higher massflow (cooling rate) through the condenser system.

Also we would like to know the entrainment 15 with regard to the velocity in the kettle 10 for a given design of the condenser system.

3.1 The Cyclone

Referring now to FIG. 24, a cyclone 100 is able to separate entrained particles 15 from vapor 13 at a high efficiency.

At the entrance to the cyclone 100, the liquid drop 15 would be forced to run along the wall, because of the centrifugal force (momentum of the droplets 15). The liquid droplet 15 would fall down and be collected in a collector 120.

Between the cyclone 100 and the collector 120 is installed a sight glass 130, that will show you when entrainment 15 occurs.

If the collector 120 is going to fill up, you close valve 145 and open valve 150. Now you just open the valve 140 for a moment and the entrained particles 15 in the collector 120 will be sucked back into the kettle 10 because of the vacuum in the kettle 10.

If you want a sample of the entrained particles 15, you close valve 145 and 150 and open valve 140 and 160.

The only questions about a cyclone 100 is the pressure drop and keeping it clean. This cyclone 100 has to handle a high volumeflow. Consequently the velocity through the cyclone 100 would be very high. The pressure drop of the cyclone 100 is a function of the velocity:

$$DP_{cyc} = C \cdot W_{cyc}^2 \quad (34)$$

$DP_{cyc}$=Pressure drop through the cyclone, lbs/(ft·sec$^2$)

C=Constant $W_{cyc}$=Inlet velocity of the cyclone, ft/sec

With a higher velocity you will get a higher pressure drop in the cyclone 100.

A higher pressure drop in the condenser 16 would mean that you are unable to cooldown the batch 11 fast enough at low temperature. This is because once maximum vacuum in the vacuum line 12 is reached, the pressure drop through the cyclone 100 would take too much of the pressure difference driving force. The remaining pressure difference for the kinetic energy (massflow, cooling rate) is too small to cooldown the batch 11 fast.

At low temperature and low pressure the condenser system will lose its efficiency. This problem is solved by the operation of the High and Low Temperature Sequence.

3.2 High and Low Temperature Sequence

Referring now to FIG. 25, at a high temperature you have a high pressure difference in the condenser system (from kettle 10 to the vacuum line 12) available.

The maximum vacuum, depending on the vacuum pumps and leaks in the system, is about 27–29 inches of mercury.

At high temperature you have the driving force to get the kinetic energy (massflow, cooling rate of the system to handle the pressure drop through the condenser system to handle the pressure drop through the cyclone 100 to handle the pressure drop through the vapor recovery line 14

At low temperature you want less pressure drop and more pressure difference (driving force) for the kinetic energy (massflow, cooling rate) so that you can cooldown the batch 11 as fast as possible.

To achieve both possibilities, the design shown in FIG. 26 is proposed.

At high temperature, you close the valve 320 in the vapor recovery line 14 and the vapor 13 with the liquid droplets 15 will go through the cyclone 100 and the entrained liquid 15 will be separated. The connection to the KEEC-tank is in front of the valve 320 so the system is always protected.

At low temperature, depending on the available pressure difference, to get a certain velocity in the kettle 10, you open the valve 320 and close valve 310. The velocity at which the valve 320 is open depends on the drop size you can afford in the condenser system.

You assume a certain drop size of the entrained liquid 15 in the system. Now you calculate the velocity in the kettle 10, vapor recovery line 14 and the pressure difference in the condenser system.

If you reach this pressure difference between kettle 10 and vacuum line 12, you open the valve 320. You are now able to cooldown to the lowest temperature as fast as possible without getting a larger drop size in the condenser system.

The vapor 13 would go through the vapor recovery line 14, because of the higher pressure drop through the cyclone 100.

3.3 Practical Considerations

Because the entrained liquid 15 can be very sticky and the viscosity is very high, severe fouling of the cyclone 100 could occur.

Proposal for design a) The inlet and outlet diameter of the pipe 20 leading to the cyclone 100, as well as the diameter of the cyclone 100 itself, should be slightly oversized to prevent a higher friction factor caused by a decrease in the diameters due to liquid coating the walls.

b) The cyclone 100, collector 120 and the return line 2601 to the kettle 10 should be heat traced to keep the viscosity low. The entrained liquid 15 flows easier to the collector 120.

4. Existing Condenser System in Comparison to the proposed Condenser System

This chapter will compare and explain the improvements needed to be done to the prior art. It describes the design and operation of the existing condenser system and explains why and what needs to change in particular.

FIG. 37 (existing condenser system) and FIG. 36 (improved condenser system) show the differences in two pictures. This will help to have an overview and shows the improvement in direct comparison.

4.1 What to improve

Each plant and each kettle 10 has to be analyzed and checked for all these considerations and changes have to be done to balance the condenser system.

However, this section will describe important improvements needed in almost every kettle 10 to run the batch 11 more safely and more efficiently.

4.1.1 Entrainment

The prior art has no control over entrainment 15 and there is no installation of any equipment to keep down the entrainment 15.

Referring now to FIG. 27, the prior art is filling up the kettles 10 from 80% capacity to the very top (full capacity). There is not much head left from the boiling surface to the kettle head to keep down the drop size.

The effect is that the droplets 15 will accelerate to the velocity in the vapor recovery line 14. Big droplets 15 will be torn off the batch surface and have no possibility to settle down.

Once the entrained particles 15 reaches the vapor recovery line 14, it will run to the condenser 16 because of the high velocity and create fouling.

The system for preventing entrainment 15 is designed poorly and needs to be improved.

The prior art requires operating carefully to keep down the entrainment 15. The operators at the plant may pull 1–2 in. of Hg to cooldown the batch 11 and keep down the drop size.

But to operate with a little pressure difference will keep the cooling rate low because of the small kinetic energy (small massflow) in the condenser system. This is not an efficient way to prevent entrainment 15, because it uses only a small portion of the condenser 16 capacity. To find another solution for entrainment 15 and at the same time have the possibility to increase the driving force (pressure difference in the system) is one of the keys to increasing the cooling capacity of the condenser system and running the batch 11 more safely and more efficiently.

For example, if the prior art cooling rate is about 2–3 Btu/min/lbs at 180° F. That indicates a velocity in the kettle 10 of 2–3 ft/sec. But the kettles 10 have no head space to get the small velocity and lamina flow in the kettle vapor space. Right now the velocity increases immediately from 0 ft/sec to about 150–200 ft/sec in the vapor recovery line 14. The entrainment 15 (drop size) in that case is much higher then the drop size would be at lamina flow from 2–3 ft/sec in the kettle 10.

Just to have the kettle head space and to increase the velocity in the kettle 10 by a factor of two to about 6 ft/sec would already drop down the entrainment 15 much and increase the cooling capacity 100%.

To put a cyclone 100 in with the High and Low Temperature Sequence would be even more powerful, because you could see your entrainment 15 in regard to the velocity in the kettle 10. Also it gives you a sample station during the cook time.

The necessary changes are:
a. The prior art has to increase the height between boiling surface and kettle head
b. Integration of a cyclone 100 with the High and Low Temperature Sequence to the condenser system The improved version is shown in FIG. 28.

4.1.2 Vapor Recovery Line

The vapor recovery line 14 of many of the existing kettles 10 are very small and that causes a high pressure drop through the condenser system. Additionally you need more effective height in the reflux line 19 to overcome this higher pressure difference in the system. Thus less pressure drop helps the design of the reflux line 19.

4.1.3 The Reflux line

Referring now to FIG. 29, the design of the reflux line 19 is another important consideration in the condenser system.

The reflux line 19 has to have the capacity to handle each possible pressure difference in the system and each massflow coming out of the condenser 16, even at a run away reaction.

To overdesign the reflux line 19 is recommended, because of the extreme situation of an out of control reaction.

The prior art has not focused previously on the design of the reflux line 19. In fact in almost every plant, the reflux line 19 on each kettle 10 is not designed in a proper and necessary way.

a. The effective height $H_r$ to take care of the pressure difference in the system and to get the condensed liquid (reflux) 21 back into the kettle 10 is far too small.

In some cases the height is 1–2 ft.

You may get a siphon effect (which raises the effective height of the condenser 16), if the massflow is high enough. In normal operation you will flood the condenser 16 before you get the siphon effect.

In case of a run away reaction, you may sometimes get the siphon effect provided the massflow is in motion and the condenser 16 is not flooded. But the danger of flooding the condenser 16 first (cuts the cooling capacity immediately) negates reliance on the siphon effect. The design of the reflux line 19 has to be made without including the siphon effect.

To emphasize the importance of the height $H_r$ you should look at the FIG. 23, again.

The pressure difference of the system (equation 24) is the main part of the equation 23. If the diameter of the vapor recovery line 14 is smaller, you have a higher pressure drop in the system to get the same cooling rate as a kettle 10 with a bigger vapor recovery line 14.

That indicates a need of more height $H_r$ in the reflux line 19 to handle this higher pressure difference. Also at a run away reaction the pressure difference is very high and you have to handle a high massflow because of the higher density at higher temperature.

b. Referring now to FIG. 30, the design of the reflux line 19 on the existing equipment cause the returning reflux 21 to disturb the boiling surface.

The colder reflux 21 drops on the boiling surface and locally cools down some of the boiling surface. In this area the liquid boiling in the kettle 10 would stop. The liquid 11 in the kettle 10 has to vaporize and has to go through the boiling surface. To get a higher cooling rate it is necessary to avoid this effect.

c. Prevention of condenser 16 flooding

Referring now to FIGS. 37 and 31, the only current prevention for condenser 16 flooding is to see a liquid level rising up in a sight glass 3101 (FIG. 36). At that point the operator cuts down the vacuum.

This is not the proper way to do it. First you cut down the cooling rate and secondly it is hard to see a liquid level sometimes because you have a massflow going through the reflux line 19.

If you flood the condenser 16 under normal operating conditions, that already indicates an improper design of the reflux line 19.

d. Traffic problem

Referring now to FIG. 31, at the entrance ox the reflux line 19, there is no collecting channel for the reflux 21 coming out of more than 500 tubes 17.

This creates a higher friction factor and also foaming. Both need to be prevented.

4.1.4 How to operate

Referring now to FIG. 32, the condenser system is mainly used to keep the time temperature profile of the processing cooktime in shape. You need the condenser system under normal operation in two cases:

1. to keep a certain temperature in the kettle 10 constant and to remove the exothermic heat
2. to cooldown the batch 11 to a certain temperature or to the lowest temperature at the final cooldown as fast as possible In the first case, the operators set the pressure in the vacuum line 12 (the vacuum sensor 410 is on the vacuum line 12 on almost every kettle 10) equal to a desired pressure thereby attempting to maintain a constant temperature in the kettle 10.

But this is not the right place to measure the pressure, because you will have a pressure difference between the vacuum line 12 pressure and the kettle 10 pressure. That means the temperature and the pressure in the kettle 10 rise until you have created a pressure difference in the system high enough to get the proper massflow (cooling rate) to catch the temperature rise in the batch 11.

The operators, at this point, are already worried about the system, because the batch temperature rises too far (the temperature/pressure is not equal due to the system DP).

The condenser system can not work, before it has as its driving force, the pressure difference.

You have to measure the pressure in the kettle 10 at pressure sensor 3202 and to use it as the set point. The liquid 11 in the kettle 10 would start boiling right at this pressure and corresponding temperature and in this case the vacuum pump 901 will work and create the pressure difference in the system to keep the set point pressure (temperature) constant.

If you know the heat creation of the exothermic reaction you can calculate, as described in chapter 2.2.8, the necessary pressure difference to keep the batch temperature constant.

Another advantage is that the operators are more confident and trust the system.

In the second case, the operators watch the sight glass 3101 in the reflux line 19 and may pull 1–2 in. of mercury to cooldown the batch 11. If the liquid level rises up in the sight glass 3101 they cut down the vacuum and thus they cut the cooling rate.

In both cases the operation is not efficient and needs to be changed along with the design of the reflux line 19 and the entrainment 15.

Referring now to FIG. 32, an improved proposal: How to operate is shown.

The prior art has to add two pressure sensors and transmitters or one absolute pressure sensor 3203 and one differential pressure sensor 3202 (more accurate) to measure the pressure in the kettle 10 and the vacuum line 12.

To keep a certain temperature constant, the operators take the pressure in the kettle 10 as set point. They will see the pressure in the vacuum line 12 dropping down with a higher creation of exothermic heat rate, because the vacuum pump 901 has to pull more pressure difference to maintain the pressure in the kettle 10.

Referring now to FIG. 33, for a cooldown or the final cooldown each kettle 10 and each condenser system will have an optimum pressure difference operation to cool down the batch 11. The optimum pressure difference is based on all parts of the condenser system and will prevent a high entrainment 15 or flooding the condenser 16 while cooling efficiently.

An Analysis and Simulation program has been developed to calculate the optimum pressure difference performance for each kettle 10 and condenser system to achieve the maximum cooling performance possible.

Therefore, for a cooldown, the operators just have to follow the calculated pressure difference curve as closely as possible.

To do that, the operators take the pressure in the vacuum line 12 as pressure set point and follow the calculated pressure temperature profile to cooldown the batch 11 as fast as possible.

4.1.5 Behavior at a Run Away Reaction

If the batch 11 is getting out of control, the temperature and pressure will exceed 212° F. and 1 atmosphere.

The operators have to catch this temperature and pressure rise. In this case the pressure difference and massflow (high density at high temperature) in the system is increasing to 3–4 in. of Hg above atmospheric pressure before the rupture disk to the KEEC-tank will break. In some cases, the reflux line 19 already cannot handle this pressure difference and massflow. Consequently the condenser 16 is already flooded and the cooling capacity has been reduced.

Additionally, the operators want to cool down the batch 11 below 212° F. and pull vacuum. Now the pressure difference is even higher and flooding of the condenser 16 becomes even more severe (because of the improper design of the reflux line 19).

At this point you cannot catch the run away reaction, because you lost your cooling capacity and the rupture disk will break.

Therefore, you have to prevent flooding the condenser 16.

Note: For each design of the condenser system, there is a certain maximum pressure difference to pull. If you exceed this pressure difference you lose cooling capacity.

Improved behavior at a run away reaction

First of all, the design of the reflux line 19 needs to be changed and the system needs to be balanced well to hit the flooding point of the condenser 16 at much higher pressure difference and higher massflow.

To prevent flooding the condenser 16 is the key in this case and there are two ways to do it:

a. Referring now to FIG. 34, an automatic means for prevention of condenser 16 flooding is shown.

The operators pull vacuum very hard and keep the vacuum. If the level in pipe 3402 rises above a certain height it will be registered with a level indicator 3401 and a control valve 3403 lets some air into the system until the level in pipe 3402 drops down to a certain height. Now the control valve 3403 closes again and the vacuum builds up to this maximum height in the reflux line 19 were the procedure is started over again.

b. Referring now to FIG. 35, a manual system for condenser 16 flooding is shown.

The operators are watching sight glass 3502 and if the liquid level is rising up in the sight glass 3502 they start to reduce down the vacuum a little bit until the liquid level drops down. Now they pull vacuum again until they see the liquid level rising up again.

In both cases the condenser 16 will not be flooded and the system will still work in this extreme situation with maximum cooling capacity of the system.

The system needs to be cleaned after any run away reaction, even if you catch it before the rupture disk breaks.

It will be understood that the foregoing preferred embodiments are exemplary, and that alternative embodiments can be made without departing from the basic scope of the present invention, which invention is limited solely by the appended claims.

What I claim is:

1. A condenser cooling and temperature control system for condensing the vapor resulting from the processing of a boiling batch not containing resin, comprising:

(a) an enclosed container for cooking or cooling a batch not containing resin, and including a first opening in said container for receiving a vapor recovery line means and a second opening in said container for receiving a reflux line means;

(b) a condenser means for condensing the vapor produced during the processing of said boiling batch in the container;

(c) a vapor recovery line means in communication with said first opening and with the condenser means whereby vapor and particles resulting from the processing of said batch are permitted to escape from the container and vapor is transported to the condenser;

(d) a vacuum pump means and a vacuum line located downstream of said condenser means for establishing a pressure differential between said condenser means and said vacuum line whereby the vapor and particles from the processing of said batch are drawn from the container through the vapor recovery line means and through the condenser means;

(e) a reflux line means for carrying a condensate from the condenser means to the enclosed container, said reflux line means having a positive pressure;

(f) an entrainment extraction means providing removal of particles from the vapor drawn from the container and introduced into the vapor recovery line means, said entrainment removal means being located before the introduction of said vapor into said condenser means;

(g) a means for determining the pressure differential between the container and the vacuum line; and (h) at least one alternative vapor recovery line means for routing vapor and particles resulting from the processing of said batch from said container to said condenser means, and a flow directing means in communication with said alternative vapor recovery line means, wherein said entrainment extraction means is bypassed in response to a reduction of said pressure differential by a predetermined amount.

2. A condenser cooling and temperature control system as claimed in claim 1, wherein said entrainment extraction means includes a cyclone.

3. A condenser cooling and temperature control system as claimed in claim 1, further including:

(i) an entrainment collector means in communication with the entrainment extraction means for collecting entrainment from the entrainment extraction means, wherein said entrainment collector means is in communication with said container to provide for return of the particles extracted from the vapor by the entrainment extraction means to the container.

4. A condenser cooling and temperature control system as claimed in claim 1, wherein said means for determining the pressure differential between the container and the vacuum line includes a means for measurement of-pressure at the vacuum line.

5. A condenser cooling and temperature control system as claimed in claim 1, wherein said means for determining the pressure differential between the container and the vacuum line includes a means for measurement of pressure at the container.

6. A condenser cooling and temperature control system for condensing the vapor resulting from the processing of a boiling batch, including:

(a) an enclosed container for cooking and cooling the batch, and including a first opening in said container for vapor recovery line and an opening in said container for a reflux line;

(b) a condenser means for condensing the vapor produced during the process of processing a boiling batch in the container;

(c) a vapor recovery line means in communication with the container and with the condenser whereby vapor resulting from the processing of the batch is permitted to escape from the container and may be transported to the condenser;

(d) a vacuum pump means for pulling a vacuum through said condenser means to said container whereby the vapor from the processing of the batch is drawn from the container through the vapor recovery line to the condenser;

(e) a reflux line means for carrying the condensate from the condenser to the enclosed container, said reflux line having a positive pressure between the condenser and the container; and (f) a means for measuring at least one variable of mass flow through the condenser system.

7. A condenser cooling and temperature control system as claimed in claim 6, wherein said means for measuring at least one variable of mass flow includes means for measuring the velocity of the mass flow through the condenser system.

8. A condenser cooling and temperature control system as claimed in claim 6, wherein said means for measuring at least one variable of mass flow includes means for measuring the differential pressure between a first point in the condenser system and at least one additional point in the condenser system.

9. A condenser cooling and temperature control system as claimed in claim 8, wherein said first point is located at the container.

10. A condenser cooling and temperature control system as claimed in claim 8, wherein said means for measuring the differential pressure includes a liquid level indicator measuring the liquid level in the reflux line or in a bypass line.

11. A condenser cooling and temperature control system for vacuum cooling and temperature control of a batch container including;

(a) an enclosed container for processing a boiling batch, and including an opening in said container for vapor recovery line and an said container for a reflux line;

(b) a condenser means for condensing the vapor produced during the processing of the batch in the container;

(c) a vapor recovery line means in communication with the container and with the container whereby vapor resulting from the processing of the batch is permitted to escape from the container and may be transported to the condenser;

(d) a vacuum pump means for pulling a vacuum through said condenser means to said container whereby the vapor from the processing of the batch is drawn from the container through the vapor recovery line to the condenser;

(e) a reflux line means for carrying the condensate from the condenser to the enclosed container, said reflux line having a positive pressure between the condenser and the container;

(f) a means for measuring at least one variable of mass flow through the condenser system; and (g) a means for controlling the differential pressure between a first point in the condenser system and at least one additional point in the condenser system in order to provide a desired differential pressure.

12. A condenser cooling and temperature control system as claimed in claim 11, wherein said means for measuring at least one variable of mass flow includes means for measuring velocity of mass flow.

13. A condenser cooling and temperature control system as claimed in claim 11, wherein said means for measuring at least one variable of mass flow includes means for measuring measuring the differential pressure between a first pressure measurement point in the condenser system and at least one additional pressure measurement point in the condenser system.

14. A condenser cooling and temperature control system as claimed in claim 13, wherein said first pressure measurement point is located at the container.

15. A condenser cooling and temperature control system as claimed in claim 13, wherein said means for measuring the differential pressure includes a liquid level indicator measuring the liquid level in the reflux line or in a bypass line.

16. A condenser cooling and temperature control system as claimed in claim 11, wherein said means for controlling the differential pressure between a first point in the condenser system and at least one additional point in the condenser system, includes means for controlling the differential pressure between the vacuum line and at least one additional point in the condenser system.

17. A condenser cooling and temperature control system as claimed in claim 11, wherein said means for controlling the differential pressure between a first point in the condenser system and at least one additional point in the condenser system, includes means for controlling the differential pressure between a first point in the condenser system and the container.

18. A condenser cooling and temperature control system as claimed in claim 11 further including:

(h) a means for measuring absolute pressure or temperature in the condenser system at least one absolute pressure temperature measurement point in the condenser system.

19. A condenser cooling and temperature control system as claimed in claim 11, wherein said absolute pressure measurement point is at the container.

20. A condenser cooling and temperature control system as claimed in claim 11, wherein said means for measurement of the differential pressure includes a liquid level indicator measuring the liquid level in the reflux line or in a bypass line.

21. A condenser cooling and temperature control system for condensing the vapor resulting from the processing a boiling batch, including:

(a) an enclosed container for processing the batch and including an opening in said container for a vapor recovery line and an opening in said container for a reflux line:

(b) a condenser means for condensing the vapor produced during the processing of the batch in the container:

(c) a vapor recovery line means in communication with the container and with the condenser whereby vapor and particles resulting from the batch are permitted to escape from the container and vapor may be transported to the condenser:

(d) a vacuum pump means for pulling a vacuum through said condenser means to said container whereby the vapor and particles from the processing of the batch are drawn from the container through the vapor recovery line to the condenser;

(e) a reflux line means for carrying the condensate from the condenser to the enclosed container said reflux line having a positive pressure between the condenser and the container;

(f) an entrainment detection means at least one point in the condenser system for detection of the particles drawn from the container and introduced into the vapor recovery line; and (g) a means for measuring at least one variable of mass flow through the condenser system; and (h) a means for measuring absolute pressure or temperature in the system at least one absolute pressure temperature measurement point in the condenser system.

22. A condenser cooling and temperature control system as claimed in claim 21 further including;
  (i) a means for controlling the differential pressure between a first point in the condenser system and at least one additional point in the condenser system in order to provide a desired differential pressure.

23. A condenser cooling and temperature control system as claimed in claim 22, wherein said means for controlling the differential pressure between a first point in the condenser system and at least one additional point in the condenser system, includes means for controlling the differential pressure between a first point in the condenser system and the container.

24. A condenser cooling and temperature control system as claimed in claim 21 further including an entrainment extraction and removal means for extraction and removal of entrainment prior to entry of the vapor into the condenser.

25. A condenser cooling and temperature control system as claimed in claim 24 further including;
  (k) a means for returning extracted entrainment to the container.

26. A condenser cooling and temperature control system as claimed in claim 21 further including;
  (j) a bypass means for bypassing said entrainment extraction and removal means in response to lack of entrainment or absolute condenser system pressure or temperature.

27. A condenser cooling and temperature control system as claimed in claim 21, wherein said means for measuring at least one variable of massflow includes means for measuring velocity of massflow.

28. A condenser cooling and temperature control system as claimed in claim 21, wherein said means for measuring at least one variable of massflow includes means for measuring the differential pressure between a first pressure measurement point in the condenser system and at least one additional pressure measurement point in the condenser system.

29. A condenser cooling and temperature control system as claimed in claim 28, wherein said first pressure measurement point is located at the container.

30. A condenser cooling and temperature control system as claimed in claim 28, wherein said means for measuring the differential pressure includes a liquid level indicator measuring the liquid level in the reflux line or in a bypass line.

31. A condenser cooling and temperature control system as claimed in claim 28, wherein said means for controlling the differential pressure between a first point in the condenser system and at least one additional point in the condenser system includes means for controlling the differential pressure between the vacuum line and at least one additional point in the condenser system.

32. A condenser cooling and temperature control system as claimed in claim 21, wherein said absolute pressure measurement point is in the vacuum line and measures absolute pressure at the vacuum line.

33. A condenser cooling and temperature control system as claimed in claim 21, wherein said absolute pressure temperature measurement point is in the container.

34. A condenser cooling and temperature control system as claimed in claim 21, wherein said entrainment extraction and removal means includes a cyclone.

35. A condenser cooling and temperature control system as claimed in claim 21, wherein said means for returning entrainment includes a collector.

36. A condenser cooling and temperature control system for condensing the vapor resulting from the processing of a boiling batch, comprising;
  (a) an enclosed container for cooking and cooling the batch, and including an opening in said container for a vapor recovery line;
  (b) a condenser means for condensing the vapor produced during the processing of a boiling batch in the container;
  (c) a vapor recovery line means in communication with the container and with the condenser whereby vapor and particles resulting from the processing of the batch are permitted to escape from the container and vapor may be transported to the condenser;
  (d) a pump means for establishing a pressure differential between said condenser means and said processing of the batch are drawn from the container through the vapor recovery line to the condenser;
  (e) an entrainment extraction means for removal of particles from the vapor drawn from the container and introduced into the vapor recovery line, said entrainment removal means being located before the introduction of said vapor into said condenser;
  (f) a means for detecting and measuring entrainment; and
  (g) at least one alternative vapor recovery line means for routing vapor and particles resulting from the processing of the batch from said container to said condenser, whereby said entrainmen extraction means is bypassed in response to a reduction in entrainment below a predetermined level.

37. A condenser cooling and temperature control system for condensing the vapor resulting from the processing of a boiling batch, comprising;
  (a) an enclosed container for cooking and cooling the batch, and including an opening in said container for a vapor recovery line and an opening in said container for a reflux line;
  (b) a condenser means for condensing the vapor produced during the processing of a boiling batch in the container;
  (c) a vapor recovery line means in communication with the container and with the condenser whereby vapor and particles resulting from the processing of the batch are permitted to escape from the container and vapor may be transported to the condenser;
  (d) a pump means for establishing a pressure differential between said condenser means and said processing of the batch are drawn from the container through the vapor recovery line to the condenser;
  (e) a reflux line means for carrying the condensate from the condenser to the enclosed container, said reflux line having a positive pressure between the condenser and the container;
  (f) an entrainment extraction means for removal of particles from the vapor drawn from the container and introduced into the vapor recovery line, said entrainment removal means being located before the introduction of said vapor into said condenser;
  (g) a means for detecting and measuring entrainment;
  (h) a means for determining the pressure differential between the container and the vacuum line; and
  (i) at least one alternative vapor recovery line means for routing vapor and particles resulting from the processing of the batch from said container to said condenser, whereby said entrainmen extraction means is bypassed in response to a reduction in entrainment below a predetermined level and also in response to a drop of pressure differential established by said vacuum pump means below a predetermined level.

38. A condenser cooling and temperature control system as claimed in claim 37, further including;

(j) an entrainment collector means in communication with the entrainment extraction means for collecting entrainment from the entrainment extraction means, wherein said entrainment collector means is in communication with said container to provide for return of the particles extracted from the vapor by the entrainment extraction means to the container.

39. A condenser cooling and temperature control system as claimed in claim 37, wherein said means for determining the pressure differential between the container and the vacuum line includes a means for measurement of pressure at the container.

40. A condenser cooling and temperature control system as claimed in claim 37, wherein said means for measuring the differential pressure includes a liquid level indicator measuring the liquid level in the reflux line or in a bypass line.

41. A condenser cooling and temperature control system as claimed in claim 37, wherein said means for determining the pressure differential between the container and the vacuum line includes a means for measurement of differential pressure between the vacuum line and the container.

42. A condenser cooling and temperature control system as claimed in claim 37, wherein said means for determining the pressure differential between the container and the vacuum line includes a means for measurement of the temperature of the boiling batch at the container.

43. A condenser cooling and temperature control system as claimed in claim 37, wherein said means for determining the pressure differential between the container and the vacuum line includes a means for measurement of the velocity of the reflux line.

44. A condenser cooling and temperature control system for condensing the vapor resulting from the processing of a boiling batch not containing resin, comprising:

(a) an enclosed container for cooking or cooling the batch, and including a first opening in said container for receiving a vapor recovery line means and a second opening in said container for receiving a reflux line means;

(b) a condenser means for condensing a vapor containing solid or liquid particles produced during the processing of a boiling batch not containing resin in the container;

(c) a vapor recovery line means in communication with said first opening and with the condenser means whereby vapor and particles resulting from the processing of said batch are permitted to escape from the container and vapor is transported to the condenser;

(d) a vacuum pump means and a vacuum line located downstream of said condenser means for establishing a pressure differential between said condenser means and said vacuum line whereby the vapor and particles from the processing of said batch are drawn from the container through the vapor recovery line means and through the condenser means;

(e) a reflux line means for carrying a condensate from the condenser means to the enclosed container, said reflux line means having a positive pressure;

(f) an entrainment extraction means providing removal of particles from the vapor drawn from the container and introduced into the vapor recovery line means, said entrainment removal means being located before the introduction of said vapor into said condenser means;

(g) a means for determining the pressure differential between the container and the vacuum line; and (h) at least one alternative vapor-recovery line means for routing vapor and particles resulting from the processing of said batch from said container to said condenser means, and a flow directing means in communication with said alternative vapor recovery line means, wherein said entrainment extraction means is bypassed in response to a reduction of said pressure differential by a predetermined amount.

45. A condenser cooling and temperature control system as claimed claim 44, wherein said entrainment extraction means includes a cyclone.

46. A condenser cooling and temperature control system as claimed in claim 44, further including:

(i) an entrainment collector means in communication with the entrainment extraction means for collecting entrainment from the entrainment extraction means, wherein said entrainment collector means is in communication with said container to provide for return of the particles extracted from the vapor by the entrainment extraction means to the container.

47. A condenser cooling and temperature control system as claimed in claim 44, wherein said means for determining the pressure differential between the container and the vacuum line includes a means for measurement of pressure at the vacuum line.

48. A condenser cooling and temperature control system as claimed in claim 44, wherein said means for determining the pressure differential between the container and the vacuum line includes a means for measurement of pressure at the container.

\* \* \* \* \*